(12) United States Patent
Howard et al.

(10) Patent No.: US 6,597,082 B1
(45) Date of Patent: Jul. 22, 2003

(54) HTS SUPERCONDUCTING ROTATING MACHINE

(75) Inventors: Raymond T. Howard, Franklin, MA (US); Swarn S. Kalsi, Shrewsbury, MA (US); Gregory L. Snitchler, Shrewsbury, MA (US); Bruce B. Gamble, Wellesley, MA (US); William T. Sand, Cumberland, RI (US); Peter M. Winn, Shrewsbury, MA (US); John P. Voccio, West Newton, MA (US)

(73) Assignee: American Superconductor Corporation, Westborough, MA (US)

( * ) Notice: Subject to any disclaimer, the term of this patent is extended or adjusted under 35 U.S.C. 154(b) by 49 days.

(21) Appl. No.: 09/632,776

(22) Filed: Aug. 4, 2000

(51) Int. Cl.⁷ ............................... H02K 9/00; H02K 5/00
(52) U.S. Cl. ........................ 310/261; 310/52; 310/91; 310/201
(58) Field of Search .................... 310/52, 54, 58, 310/59–61, 215, 261, 254; 505/878, 877, 876

(56) References Cited

U.S. PATENT DOCUMENTS

| | | | |
|---|---|---|---|
| 3,473,341 A | 10/1969 | Mulder | |
| 3,745,389 A | 7/1973 | Lorch | |
| 3,816,780 A | 6/1974 | Smith, Jr. et al. | |
| 3,983,427 A | 9/1976 | Ulke | |
| 3,991,333 A | 11/1976 | Laskaris | |
| 4,037,312 A * | 7/1977 | Deis | 310/52 |
| 4,092,555 A | 5/1978 | Ying et al. | |
| 4,110,648 A * | 8/1978 | Stillwagon | 310/178 |
| 4,134,037 A * | 1/1979 | Berthet et al. | 310/52 |
| 4,164,126 A | 8/1979 | Laskaris et al. | |
| 4,164,672 A | 8/1979 | Flick | |
| 4,176,291 A | 11/1979 | Rabinowitz | |
| 4,223,239 A | 9/1980 | Eckels | |
| 4,277,705 A | 7/1981 | Rios | |
| 4,396,847 A | 8/1983 | Weghaupt et al. | |
| 4,739,200 A | 4/1988 | Oberly et al. | |
| 4,808,864 A * | 2/1989 | Brunet et al. | 310/52 |
| 4,816,708 A * | 3/1989 | Laumond | 310/52 |
| 4,820,945 A * | 4/1989 | Khutoretsky et al. | 310/52 |
| 4,885,494 A | 12/1989 | Higashi | |
| 5,010,737 A | 4/1991 | Okumura et al. | |
| 5,094,083 A | 3/1992 | Horn et al. | |
| 5,385,010 A | 1/1995 | Horn | |

(List continued on next page.)

FOREIGN PATENT DOCUMENTS

| | | |
|---|---|---|
| DE | 4008912 A1 | 10/1990 |
| EP | 1026755 A1 | 8/2000 |
| WO | WO99/62127 | 12/1999 |
| WO | WO01/52393 | 7/2001 |

OTHER PUBLICATIONS

American Superconductor Annual Report 2000, pp. 16–17.
Patent Abstracts of Japan, Publication No. 57162945, Publication Date: Jun. 10, 1992, application No. 56049565, Title: "Rotor for Superconductive Rotary Electric Machine".

* cited by examiner

Primary Examiner—Tran Nguyen
(74) Attorney, Agent, or Firm—Fish & Richardson P.C.

(57) ABSTRACT

A superconducting machine of the type having a stator assembly and a rotor assembly that rotates within the stator assembly and is spaced from the stator assembly by a gap is disclosed. This arrangement can be used, for example, to produce a superconducting motor or generator. In one aspect of the invention, the superconducting rotating machine includes at least one HTS superconducting winding assembly which, in operation, generates a magnetic flux linking the stator assembly and rotor assembly, a refrigeration system for cooling the at least one superconducting winding of the rotor assembly and the superconducting rotating machine has a torque density of approximately 75 Nm/Kg or more at 500 RPM or less.

33 Claims, 23 Drawing Sheets

U.S. PATENT DOCUMENTS

| | | |
|---|---|---|
| 5,506,198 A | 4/1996 | Sato |
| 5,513,498 A | 5/1996 | Ackermann et al. |
| 5,548,468 A | 8/1996 | Shirakawa et al. |
| 5,581,220 A | 12/1996 | Rodenbush et al. |
| 5,749,243 A | 5/1998 | Lester |
| 5,777,420 A | 7/1998 | Gamble et al. |
| 5,848,532 A * | 12/1998 | Gamble et al. ............... 62/48.2 |
| 5,880,547 A | 3/1999 | Shoykhet |
| 6,066,906 A * | 5/2000 | Kalsi .......................... 310/179 |
| 6,094,333 A | 7/2000 | Kato |
| 6,140,719 A * | 10/2000 | Kalsi .......................... 310/52 |
| 6,268,678 B1 * | 7/2001 | Asao et al. ................. 310/201 |
| 6,313,556 B1 * | 11/2001 | Dombrovski et al. ......... 310/91 |

HTS SUPERCONDUCTING ROTATING MACHINE

INCORPORATION BY REFERENCE

The following applications are hereby incorporated by referenced into the subject application as if set forth herein in full: (1) U.S. application Ser. No. 09/632,599, filed Aug. 4, 2000, now is U.S. Pat No. 6,359,365 entitled "Superconiducting Synchronous Machine Field Winding Protection" (2) U.S. application Ser. No. 09/632,602, filed Aug. 4, 2000, entitled "Segmented Rotor Assembly For Superconducting Rotating Machines" (3) U.S. application Ser. No. 09/632,600, filed Aug. 4, 2000, entitled "Exciter For Superconducting Rotating Machinery" and (4) U.S. application Ser. No. 09/632,601, filed Aug. 4, 2000, entitled "Stator Support Assembly For Superconducting Rotating Machines"

The additional applications are also hereby incorporated by referenced into the subject application as if set forth herein in full: (1) U.S. application Ser. No. 09/480,430, filed Jan. 11, 2000, entitled "Exciter and Electronic Regulator for Rotating Machinery" (2) U.S. application Ser. No. 09/481,480, filed; Jan. 11, 2000, entitled "Internal Support for Superconducting Wires" and (3) U.S. Ser. No. 09/480,396, filed Jan. 11, 2000, entitled "Cooling System for HTS Machines".

This invention arose in part out of research pursuant to Contract No. N00014-99-C0296 awarded by the Office of Naval Research.

TECHNICAL FIELD

This invention relates to the construction and operation of superconducting rotating machines, and more particularly to torque transmission assemblies for use in superconducting motors.

BACKGROUND

Superconducting air core, synchronous electric machines have been under development since the early 1960s. The use of superconducting windings in these machines has resulted in a significant increase in the magneto motive forces generated by the windings and increased flux densities in the machines. These early superconducting machines included field windings wound with low temperature superconductors (LTS), originally NbZr or NbTi, and later with Nb3Sn. The field windings were cooled with liquid helium from a stationary liquifier. The liquid helium was transferred into the rotor of the machine and then vaporized to use both latent and sensible heat of the fluid to cool the windings. This approach proved viable for only very large synchronous motors and generators (e.g., larger than 500 MW). With the advent of high temperature superconductors (HTS) in the 1980s, investigations ensued to determine the feasibility of HTS windings in superconducting synchronous machines.

SUMMARY

The invention features a superconducting rotating machine having a relatively compact design, while still providing a relatively high output power. In effect, the construction provides a superconducting rotating machine possessing an increased power density characteristic.

The superconducting machine is of the type having a stator assembly and a rotor assembly that rotates within the stator assembly and is spaced from the stator assembly by a gap. This arrangement can be used, for example, to produce a superconducting motor or generator.

In one aspect of the invention, the superconducting rotating machine includes at least one HTS superconducting winding assembly which, in operation, generates a magnetic flux linking the stator assembly and rotor assembly, a refrigeration system for cooling the at least one superconducting winding of the rotor assembly and the superconducting rotating machine has a torque density of approximately 75 Nm/Kg or more at 500 RPM or less, the torque density being equal to the motor shaft torque divided by the motor mass. The high torque density at low speeds is advantageous in situations where a high-speed motor would require a gearbox to reduce output speed. Gearboxes are noisy, large and expensive. For example, the present invention could be utilized to drive a ship propeller without using a gearbox, thereby saving valuable ship space and reducing overall noise.

Gap shear stress is an effective measure of the torque density of a machine. It relates machine performance to the surface area in the gap between the rotor assembly and stator assembly. In particular, gap shear stress is numerically equivalent to the machine torque divided by the area and radius of the gap. If the rotor experiences a surface shear stress equal to the gap shear stress, a torque equal to the design torque would be transmitted to the shaft of the machine. A gap shear stress characteristic in a range between 15 lbs/in2 (psi) and 100 psi while achieving the desired 75 Nm/Kg or more at 500 RPM or less torque density characteristic.

Embodiments of this aspect of the invention may include one or more of the following features. In certain embodiments, the machine has a torque density of approximately 150 Nm/Kg or more at 300 RPM or less and a gap shear stress characteristic in a range between 30 lbs/in2 (psi) and 100 psi.

The superconducting winding assembly includes a superconducting coil having a superconductor tape wound about and disposed along an axis of the winding assembly to provide a plurality of concentric turns defining an opening. Each turn of the superconductor tape has a broad surface maintained substantially parallel to the axis of the winding assembly.

In certain embodiments, the superconducting tape is wound in a racetrack configuration defining a pair of opposing arcuate end sections and a pair of substantially straight side sections. The superconductor tape includes a multifilament composite superconductor having individual superconducting filaments that extend the length of the multifilament composite conductor and are surrounded by a matrix-forming material.

The superconductor tape includes an anisotropic high temperature superconductor, for example, Bi2Sr2Ca2Cu3O. Alternatively, the anisotropic high temperature superconductor is a member of the rare-earth-copper-oxide family.

In certain embodiments, the superconducting winding assembly includes internal support members adjacent to and alternating with the superconducting windings to help alleviate the large bending stresses that occur within the superconducting winding assembly. For example, 40-mil thick stainless steel can be alternated with the superconducting windings. The internal support members and superconducting windings form a laminate that gives mechanical strength to the system and prevents the non-circular superconducting windings from pushing themselves apart. For example, the racetrack configuration superconductor winding will attempt to become a circular winding, pushing the substantially straight side sections away from each other. The internal support members will also be coated with a thermally conductive coating that will provide a heat conduction path to cryogenic cooling tubes located within the rotor body. For example, copper could be used to coat the internal support members.

The rotor assembly of the superconducting rotating machine is enclosed in a vacuum chamber, which isolates the cryogenically cooled superconducting windings from the surrounding components. A shaft is mounted through the rotor assembly, spaced from the rotor assembly by a gap. The shaft is mounted using tangential buckle assemblies, which allow for the transfer of rotational forces between the rotor assembly and the shaft. The shaft is also mounted using axial buckle assemblies, in conjunction with the tangential assemblies. The axial buckle assemblies secure the rotor assembly axially to the shaft. Both the tangential buckle assemblies and the axial buckle assemblies utilize thermally isolating bands to thermally isolate the rotor assembly from the shaft. The shaft would act as a huge heat sink if the cryogenically cooled superconducting windings were not thermally isolated from the warm shaft. The thermally isolating bands can be manufactured from any material with a high tensile strength and low thermal conductivity. In certain embodiments, the thermally isolating bands are from a reinforced epoxy (e.g., a para-aramid and epoxy mixture). Para-aramid is sold by E.I. duPont de Numours, Wilmington, Del. under the trademark Kevlar®.

The stator assembly is manufactured utilizing diamond-shaped stator coils. The stator assembly may also include individual stator coil cooling. Each coil is wrapped with an electrically insulating material and a cooling conduit for receiving coolant from an outside source is mounted to a side of the stator coil. The electrically insulating material allows the cooling conduit, which is at ground potential, to rest against the stator coil. The cooling conduit and electrically insulated stator coil are wrapped with a thermally conductive material, which facilitates cooling from the sides of the stator coil not adjacent the cooling conduit and thereby reduces the temperature gradient in the electrically insulating material.

Utilizing the external cooling conduit and electrically insulating it from the stator coil allows fresh water to be used instead of de-ionized water and a smaller, more dense stator coil is possible because one does not have to depend on air cooling the stator assembly. In certain embodiments, two cooling conduits can be mounted on opposing parallel faces to give better cooling characteristics to the system. Also, multiple passageway conduits may be used.

In certain embodiments, the electrically insulating material may vary in thickness proportional to the voltages experienced throughout the stator assemblies. Each diamondshaped stator coil experiences varying voltage, dependent on its placement within the stator. The stator coils closest to the line voltage will require the thickest insulation. The insulation on the stator coils electrically located midway between the ends of the phase will require the thinnest insulation due to the voltage drops in preceding coils. Therefore, the thickness of the electrically insulating material decreases in steps between a maximum value at the ends of the phase and a minimum value approximately half the maximum thickness at coils electrically located midway between the ends of the phase. Varying the thickness of the electrically insulating material will help facilitate cooling, since thicker insulation will not be used where it is not needed. Similar principles but a different numerical value for minimum insulation thickness will be required for phases containing an odd number of coils.

By proper matching of the pairs of coils in a two layer winding with different insulation thicknesses, and by varying the size of wire in the coils in each pair for similar temperature rise, substantially decreased temperature rise or increased resistance to voltage breakdown may be obtained.

The superconducting rotating machine includes a cryogenic cooling system for cooling the superconducting windings. The cryogenic cooling system includes a plurality of cryogenically cooled surfaces and a cryogenic fluid transport device within the cryogenic environment that moves a cryogenic fluid between the cooled surfaces and the superconducting windings in the rotor assembly. The cryogenic fluid is transported through a closed loop system that is in fluid communication with the cryogenically cooled surfaces and in thermal communication with the rotor assembly. A rotary coupling allows the cryogenically cooled surfaces and the cryogenic fluid transport device to remain stationary while the closed loop system within the rotor assembly rotates.

In one embodiment, the cryogenic fluid transport device is a cryogenically adaptable fan. The advantage of using a cryogenically adaptable fan is that the cryogenic fluid will not experience a phase change and will not require warming the fluid to ambient temperatures. Also, a cryogenically adaptable fan is smaller and less expensive than adding compressors and heat exchangers, which require a phase change.

In certain embodiments, the cryogenically cooled surfaces are Gifford-McMahon cold heads. Pulse tubes and cryogenic refrigerators are also useful as cryogenically cooled surfaces.

Other advantages and features of the invention will become apparent from the following description and the claims.

DESCRIPTION OF DRAWINGS

Like reference symbols in the various drawings indicate like elements.

DETAILED DESCRIPTION

Figure 1:
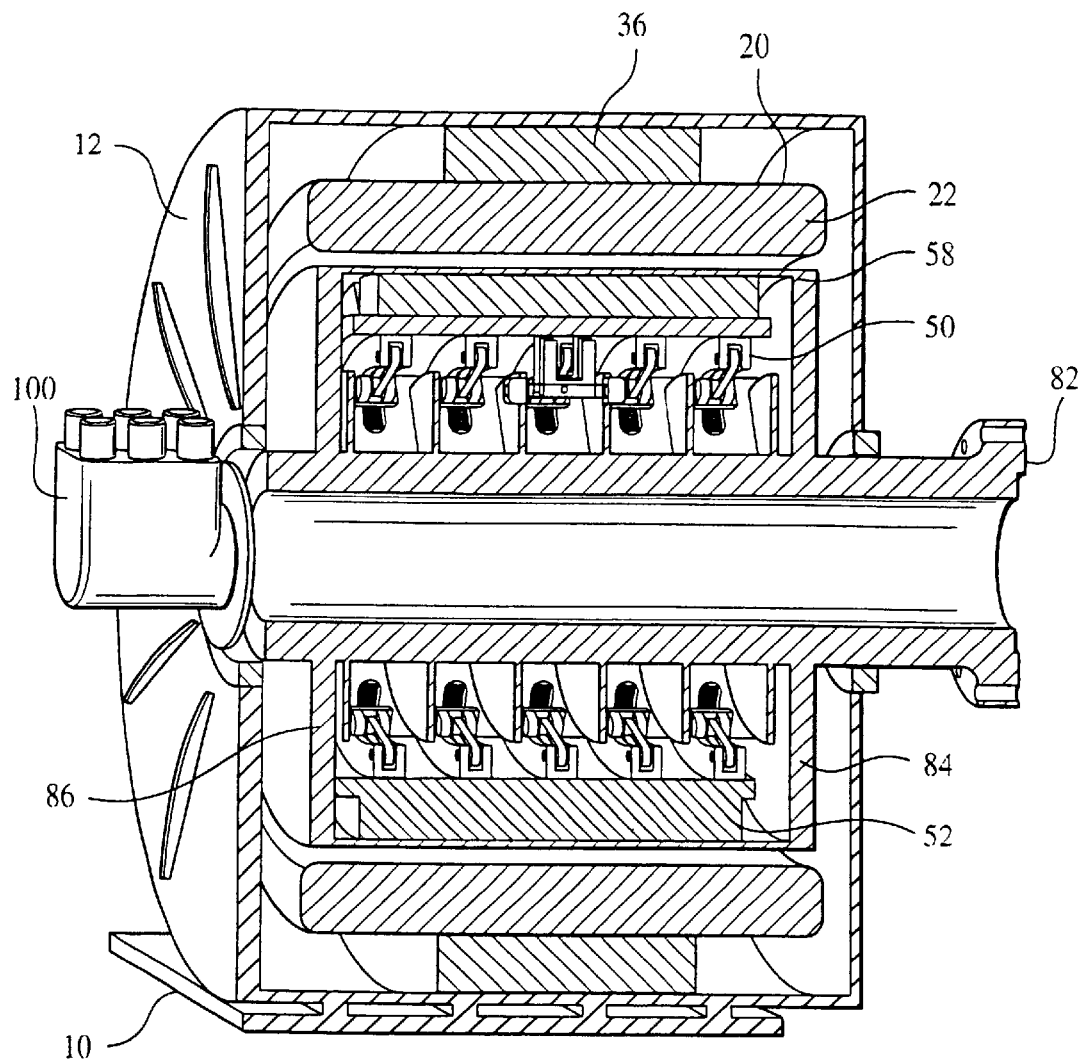
FIG. 1 is a cross-sectional perspective view of a superconducting motor in accordance with the invention.
Figure 2:
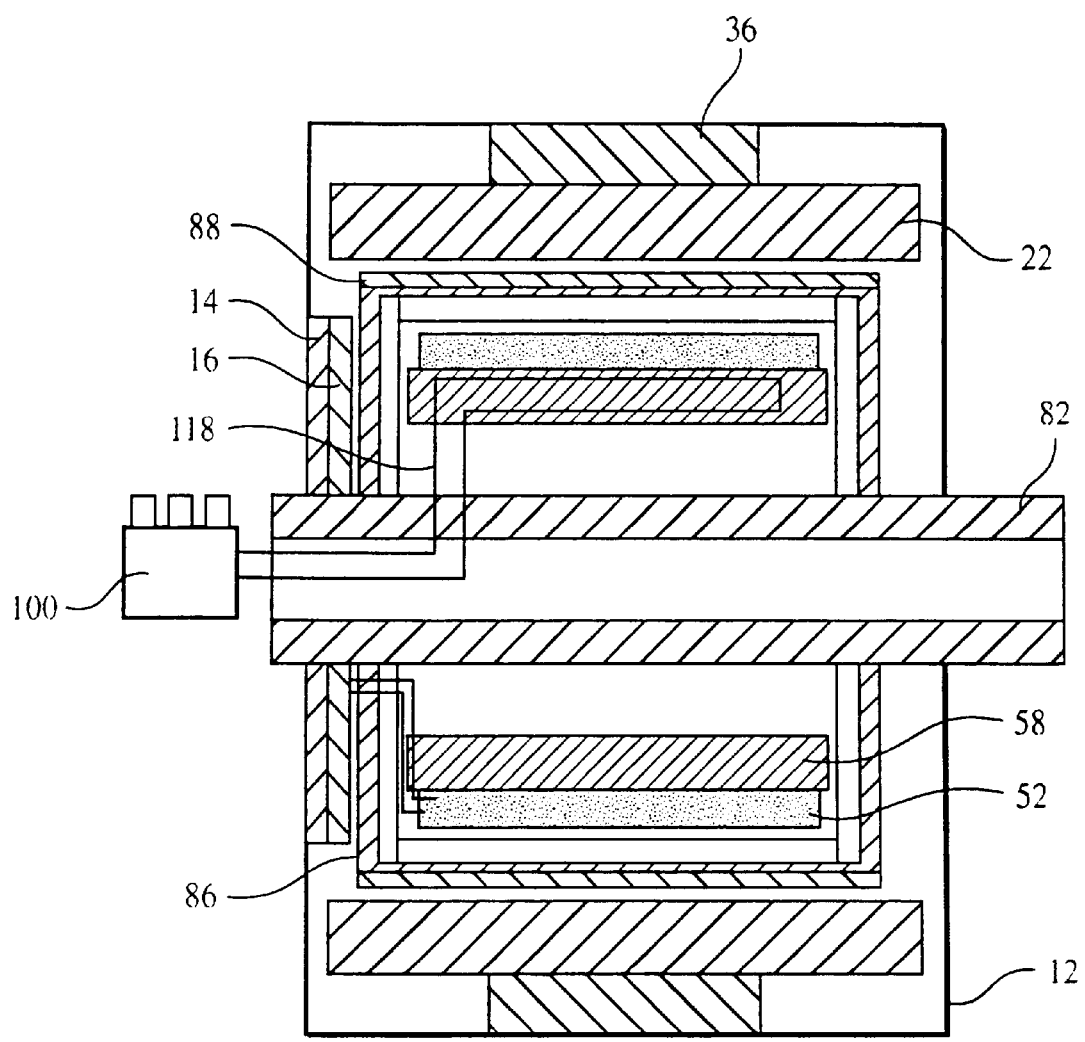
FIG. 2 is a generic cross-sectional view of the superconducting motor of FIG. 1.

Referring to FIGS. 1 and 2, a superconducting synchronous motor 10 includes a rotor assembly 50 cooled by a cryogenic cooling system 100, here a Gifford McMahon (GM) cooling system, and surrounded by a stator assembly 20. Both the stator assembly 20 and the rotor assembly 50 are mounted in a housing 12 to protect the components and any users of the superconducting motor 10. As will be described in greater detail below, each of these components and assemblies have features which contribute toward both increasing the overall performance, as well as reducing the overall size of motor 10. In particular, superconducting synchronous motor 10 can be shown to produce torque densities as high as 75 Nm/Kg or more at 500 RPM or less. Furthermore, such motors are expected to provide a greatly improved gap shear stress characteristic in a range between 15 psi and 100 psi.

Referring to FIGS. 1 and 3–5, the stator assembly 20 includes, in this embodiment, one hundred eight stator coils 22 wound around a support tube 34, and arranged in a multi-phase configuration, here a 9-phase configuration. The twelve stator coils 22 per phase provide a 12-pole arrangement. A back iron 36 is constructed by wrapping magnetic wire around the stator coils 22. The stator coils 22 are wound into a diamond pattern, with one stator coil 22 diamond representing a single pole. The stator coils 22 are arranged around the support tube 34 by overlapping sides of adjoining stator coils 22 in the same phase.

Figure 6:
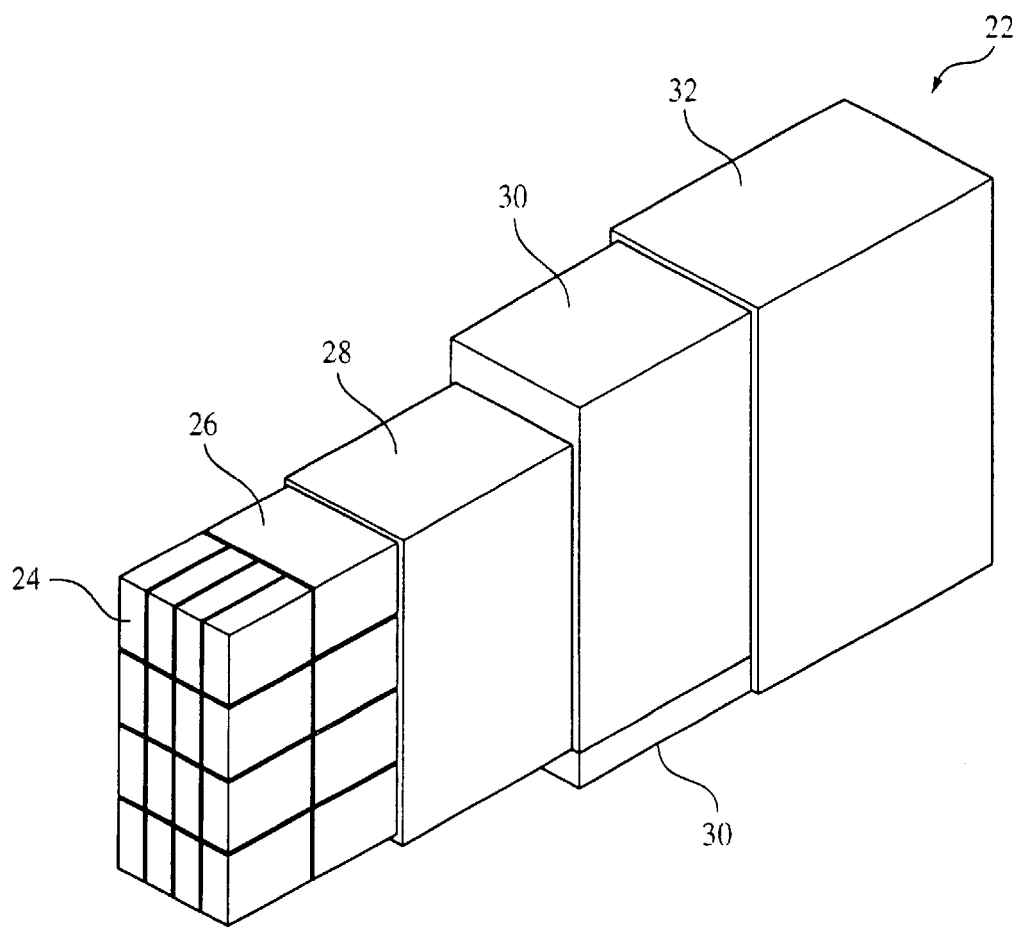
FIG. 6 is a cross-sectional perspective view of a stator coil section of the stator assembly of FIG. 3.

Referring to FIG. 6, cooling conduits 30 are positioned to be in thermal contact with each stator coil 22 to facilitate cooling of the stator assembly 20. Each cooling conduit 30 is constructed from a thin walled, high electrical resistivity alloy for minimizing eddy current heating. Each coolant passage of the cooling conduit 30 is distinct and electrically isolated from the adjacent coolant passage. Because the cooling conduits 30 are generally constructed from an electrically conductive material, an electrically insulating tape 28 is wrapped about the stator coil 22 to electrically insulate the stator coil 22 from surrounding components that are at ground potential, particularly the cooling conduits 30. In particular, the electrically insulating tape 28 maintains the cooling conduits 30 at ground potential, thereby permitting the use of fresh water, which contains ions. The electrically insulating tape 28 is made from a material having a thickness that can withstand operating voltages of the conductor turns 24, as well as the heat generated by the conductor turns 24. The thickness of the electrically insulating tape 28 is determined by the dielectric strength (insulating properties) of the material and operating voltage, typically between about 0.001 to 0.100 inches. Examples of materials for the electrically insulating tape 28 include, but are not limited to, epoxy, mica, and glass tapes.

In this embodiment, the stator coils 22 are formed of an array of multiple conductor turns 24. Each conductor turn 24 is electrically isolated from an adjacent turn by insulation 26. Insulation 26 may be formed of the same material as electrically insulating tape 28, but has a reduced thickness (e.g., 0.001 to 0.030 inches).

Figure 3:
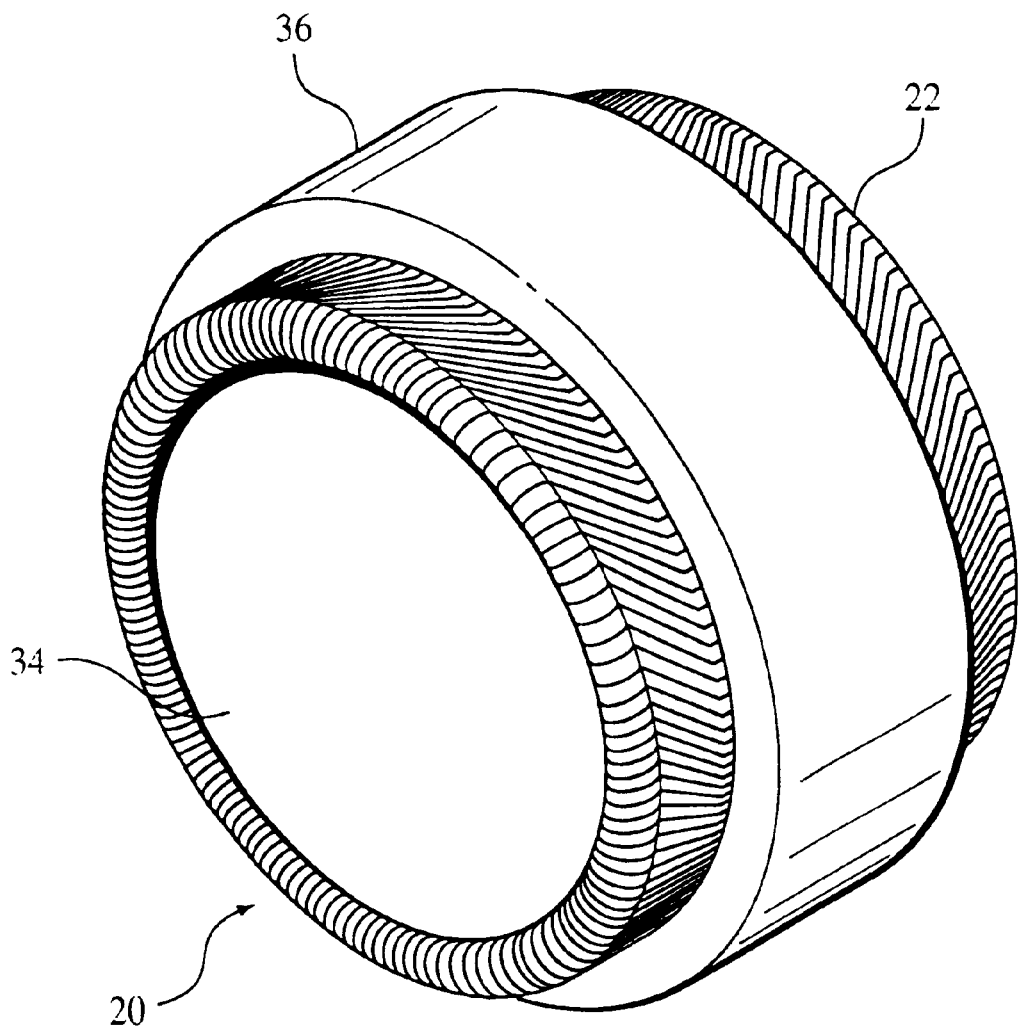
FIG. 3 is a perspective view of a stator assembly of the superconducting motor of FIG. 1.
Figure 4:
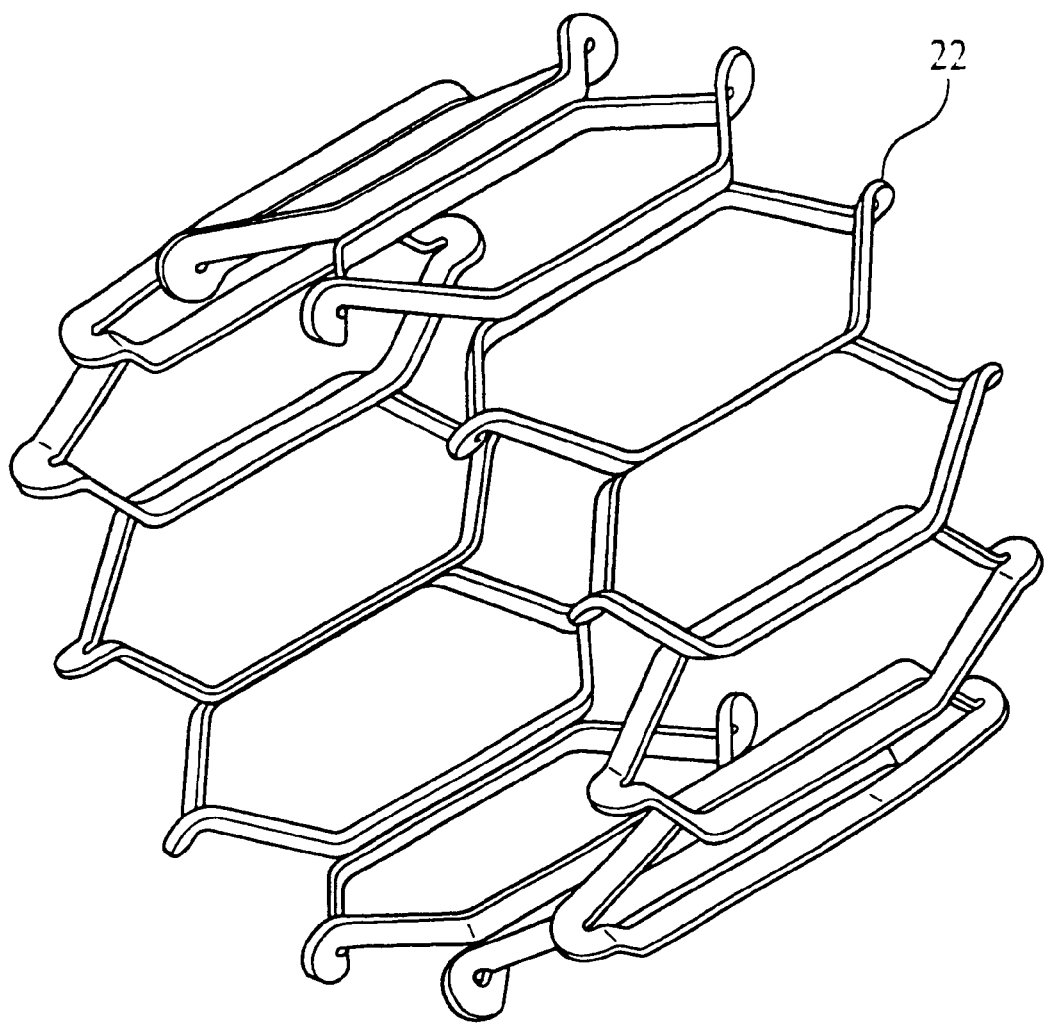
FIG. 4 is a perspective view of a single phase of stator coils of the stator assembly of FIG. 3.
Figure 5:
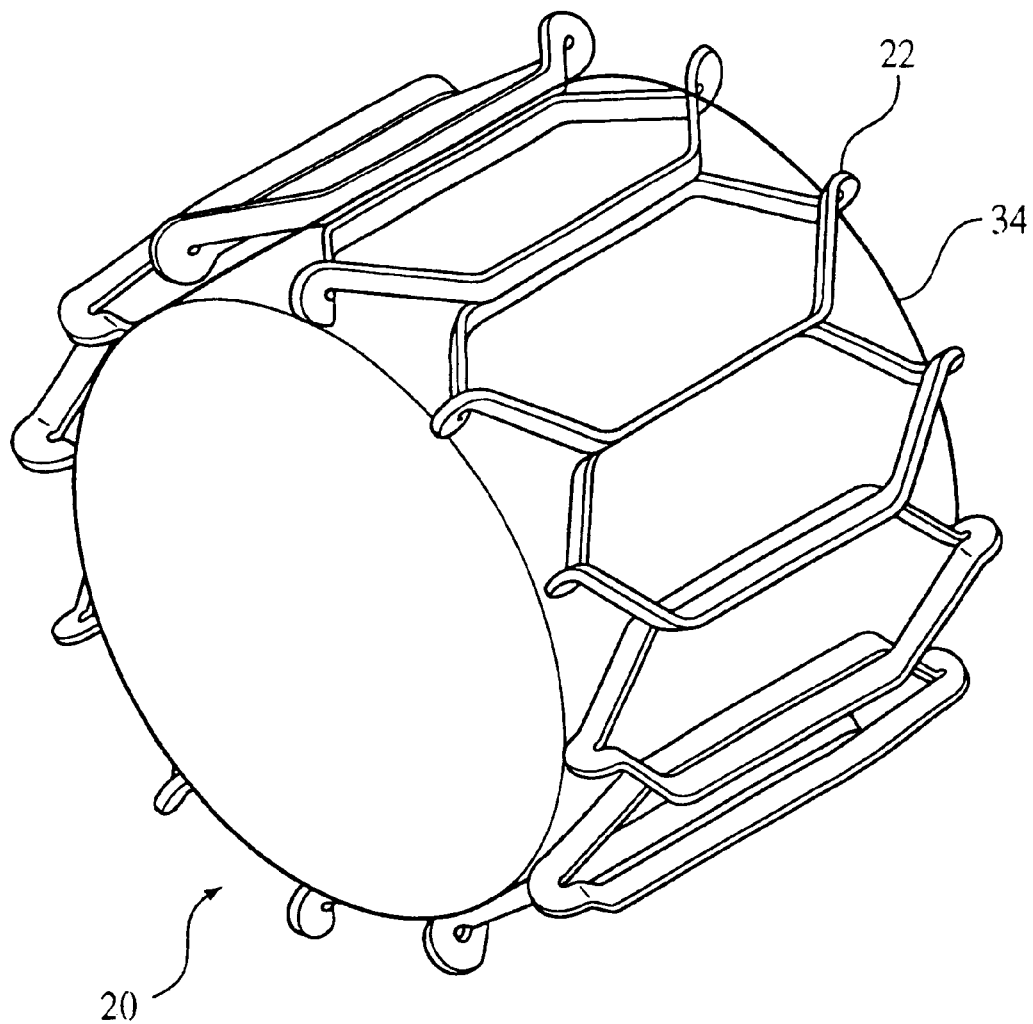
FIG. 5 is a perspective view of a single phase of stator coils mounted on the support tube of the stator assembly of FIG. 3.
Figure 6A:
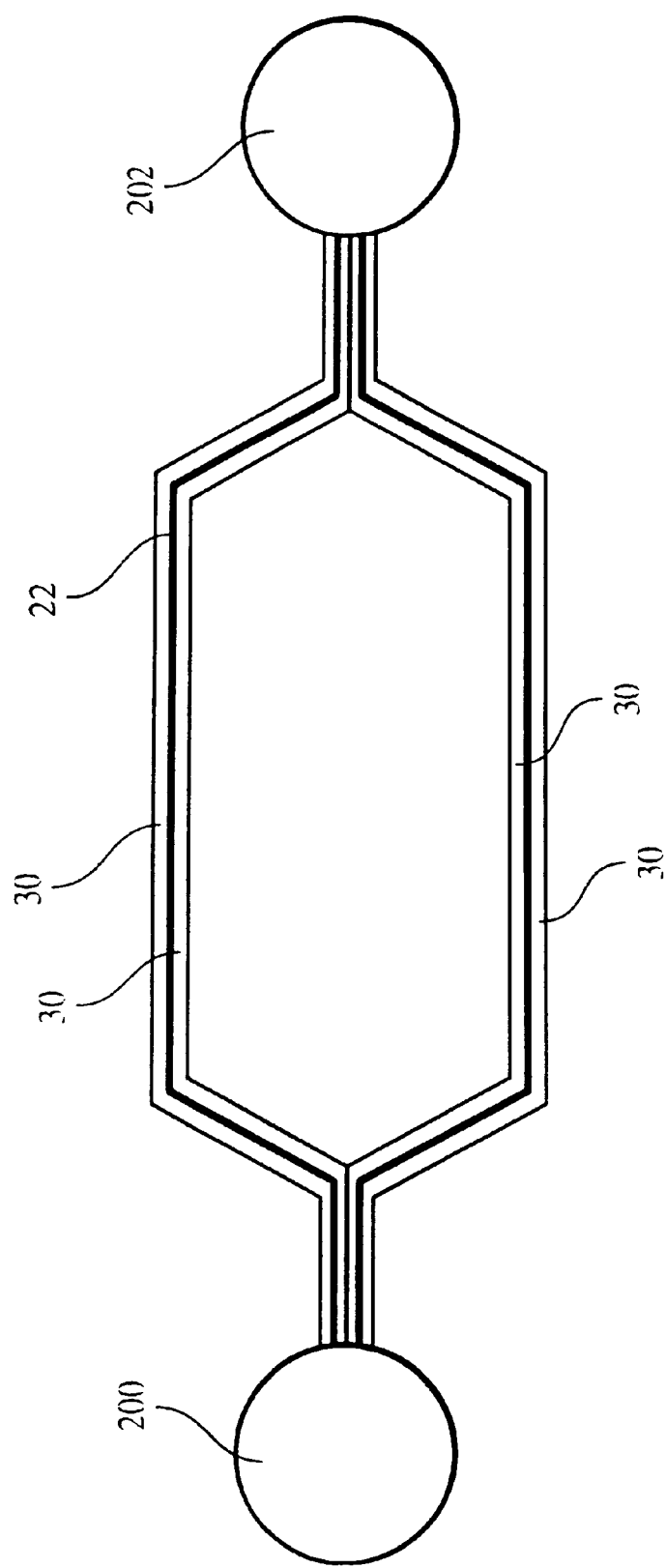
FIG. 6A is a schematic of two stator coils and an associated cooling loop.

Referring to FIGS. 6 and 6A, cooling conduits 30 are mounted adjacent to and in contact with the electrically insulating tape 28 surrounding each stator coil 22. Each cooling conduit 30 has a number of passages extending therethrough for receiving a coolant from a fresh water external source 200. With reference to FIG. 3, each cooling conduit 30 has an opening (not shown) at the end regions of each stator coil 22. Therefore, one hundred eight openings are in fluid communication with a manifold assembly (not shown) to allow fluid into each cooling conduit 30 from the external source 200. On the other side of the stator coils 22, one hundred eight openings are in fluid communication with a return 202. In one embodiment, the manifolds are end caps (not shown) circumferentially mounted to the front and back edge of the stator assembly 20.

A porous copper thermally conductive member 32, which has low electrical conductivity, is disposed about the stator coil 22 and cooling conduits 30 to facilitate cooling of the entire stator coil 22. In other embodiments, this could be constructed from a wire disposed about the stator coil 22. Absent the thermally conductive member 32, the stator coil 22 would only be cooled at the contact point between the cooling conduit 30 and the electrically insulating tape 28. Because of this contact point cooling, a thermal gradient would be induced through the electrically insulating material 28. This thermal gradient creates thermal stresses between the cooling conduit 30 and the electrically insulating tape 28, which can cause premature failure in the stator assembly 20 due to electrical breakdown at this interface. Additionally, with high power density embodiments, the cooling conduit 30 cannot be mounted on a wide side of the stator coil 22 due to the required high packing densities. To minimize the peak temperature, the thermally conductive member 32 is positioned around the stator coil 22 and the cooling conduit 30 to allow heat transfer from the sides of the stator coil 22 that are not in direct contact with the cooling conduit 30.

In certain embodiments, cooling of the stator assembly 20 is further enhanced by varying the thickness of the electrically insulating material 28. The electrically insulating material 28 isolating the conductor turns 24 in each diamond-shaped stator coil 22 from the grounded thermally conductive member 32 experiences varying dielectric stress dependent on the electrical location of the coil within a given phase of the stator assembly 20 with stator coils 22 connected in series. The two stator coils 22 at the end of the phase are connected directly to line voltage and their electrically insulating material 28 experiences maximum dielectric stress between conductor turn 24 and the thermally conducting member 32. The coils electrically located midway between the ends of the phase are exposed to approximately half the dielectric stress due to the voltage drops in the stator coils 22 between the end and middle of the phase. The thickness of the electrically insulating material 28 is varied in uniform steps directly proportional to the voltage variation. In one embodiment, the minimum thickness of the electrically insulating material 28 thickness is calculated by the relationship $T_{ins}*(0.5+(1/N))$, where $T_{ins}$ represents the maximum thickness of the electrically material 28 at coils connected to the line voltage and N represents the even number of stator coils 22 in each phase. The electrically insulating material 28 thickness will proportionally vary in uniform steps between the maximum thickness, $T_{ins}$, and the minimum thickness. Varying the thickness of the electrically insulating material 28 will help facilitate cooling, since thicker electrically insulating material 28 will not be used where it is not needed.

In another embodiment, the stator coils 22 in each phase may be arranged and connected in pairs in a two layer winding with stator coils 22 having the thinnest and thickest electrically insulating material 28 being paired. Stator coils 22 with the next thinnest and next thickest electrically insulating material 28 are then paired, this process being continued until the final two middle stator coils 22 are paired.

In certain other embodiments, the benefits of varying the thickness of the electrically insulating material 28 can be enhanced by varying the cross sectional area of each of the two stator coils 22 in the above described pairs of stator coils 22. The cross sectional area of the conducting turns 24 in the stator coil 22 with thin electrically insulating material can be decreased as higher power can be dissipated due to the decreased thermal resistance of the thin electrically insulating material 28. This makes room in the same coil pair to decrease the power dissipation in the remaining coil with thick electrically insulating material 28 by increasing the cross sectional area of its conducting turns 24. Typically winding temperature rise is reduced by 30 percent compared with the result of using conventional art with uniform insulation thickness and uniform wire cross sectional areas. Increased resistance to voltage breakdown between the conducting turns 24 and the adjacent thermally conductive member 32 can be obtained compared with conventional art by increasing the thickness of electrically insulating material 28 on each of the coils in the above coil pairs for the same higher temperature as obtained with conventional art.

Figure 7:
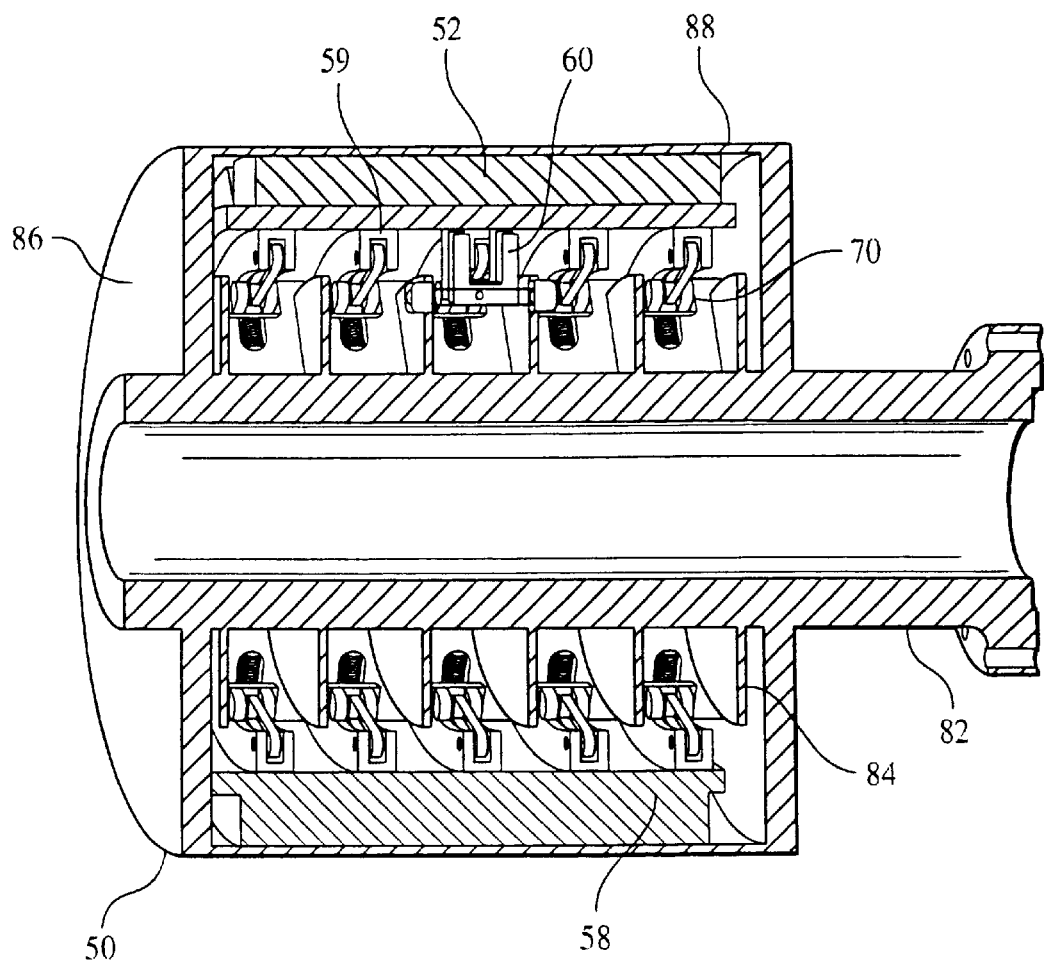
FIG. 7 is a cross-sectional perspective view of a rotor assembly of the superconducting motor of FIG. 1.

Referring to FIG. 7, the rotor assembly 50 includes a rotor body 58, onto which the superconducting rotor coils 52 are fixed, mounted onto an output shaft 82 by an array of tangential buckles 70 and axial buckles 60. As will be explained in detail below, the tangential buckles 70 and the axial buckles 60 transfer the torque and forces produced by the rotor coils 52 to the output shaft 82, while also thermally isolating the cryogenically cooled rotor body 58 from the output shaft 82. The tangential buckles 70 and axial buckles 60 are mounted between rotor body ribs 59 and output shaft plates 84, as will be described in detail below. Vacuum chamber walls 86 are integrally mounted to the output shaft 82, enclosing the rotor assembly 50 and acting as a cryostat. As will be described in detail below, a closed cryogenic cooling loop 118 (Shown in FIG. 2) is used to conduct heat from the rotor coils 52 to the cryocooler 104 where the heat can be dissipated. In particular embodiments, vacuum chamber 86 includes an outer cylindrical wall that, for reasons discussed below, serves as an electromagnetic shield 88.

Figure 8:
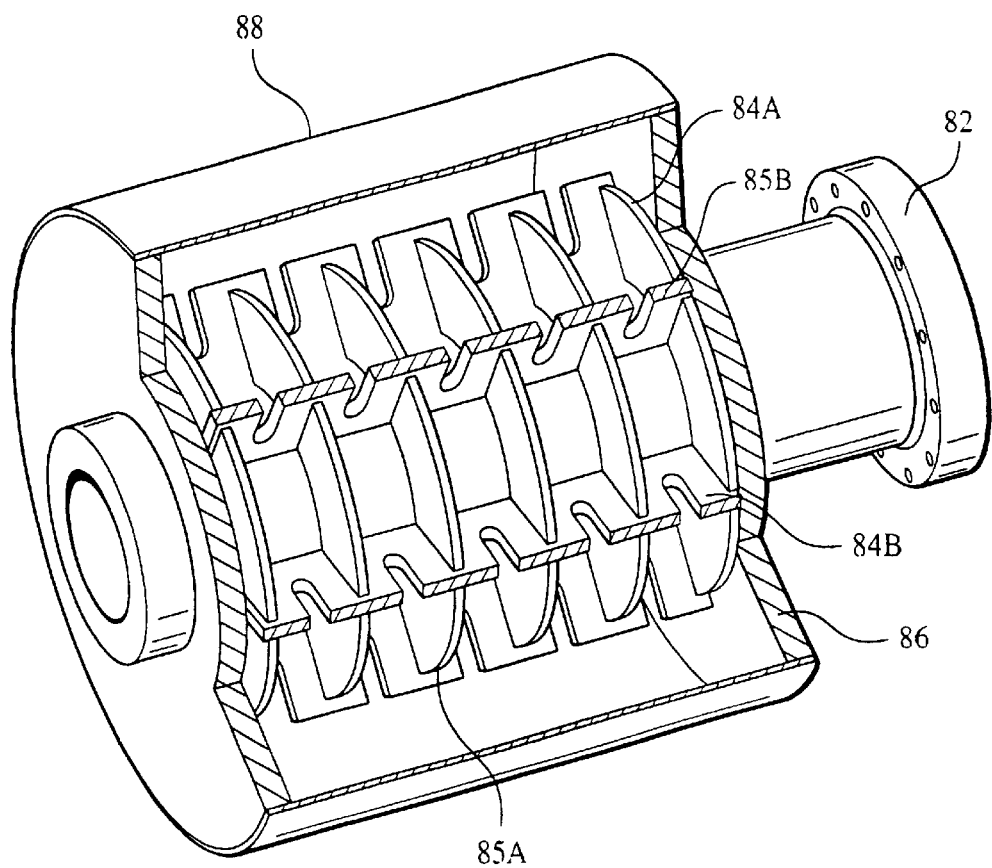
FIG. 8 is a cross-sectional perspective view of an output shaft and vacuum chamber of the rotor assembly of FIG. 7.

Referring to FIGS. 7 and 8, the output shaft 82 includes multiple plates 84 extending radially outward from the output shaft 82 surface. The multiple plates 84 include a first set of circumferentially extending plates 84A positioned around the output shaft 82 and a second set of longitudinally extending plates 84B positioned along the output shaft 82. Walls of the plates 84 form generally rectangular pockets, here thirty in number, around the surface of the output shaft 82 into which the tangential buckles 70 and axial buckles 60 mount. The plates 84 also include radial slots. Specifically, longitudinal plates 84B include radial slots 85B in every rectangular pocket wall around the output shaft 82 formed by the longitudinal plates 84B for mounting the tangential buckles 70. Similarly, the circumferential plates 84A define radial slots 85A in every other rectangular pocket wall around the output shaft 82 formed by the circumferential plates 84A for mounting the axial buckles 60. However, the present embodiment only utilizes three axial buckles displaced within the rectangular pockets in the middle of the rectangular pocket array. That is, no radial slots 85A are found on the outer circumferential plates 84A.

Referring again to FIG. 2, as discussed above, a vacuum chamber 86 is integrally mounted to the output shaft 82 and encloses the rotor assembly 50. The vacuum chamber 86 also encloses the circumferential plates 84A and longitudinal plates 84B, and is sized to allow the rotor body 58 and rotor coils 52 to be mounted to the output shaft 82. The output shaft 82 extends beyond the vacuum chamber 86 and the plates 84 at both ends. On one end, the output shaft 82 extends to connect to an external load that the motor 10 will drive. At the other end, the output shaft 82 connects to a rotating half of a brushless exciter 16.

The brushless exciter, shown in FIG. 2, includes a rotating disk 16 spaced from a stationary disk 14 (e.g., spaced 1–4 mm). Rotating disk 16 is formed of a high permeability powder or laminated material (e.g., iron) and includes a pair of concentric grooves within which a pair of coil windings is disposed. Stationary disk 14 is similarly formed of a high permeability material and includes a pair of concentric grooves within which a pair of coil windings is disposed. In essence, this arrangement provides a transformer having a primary, which rotates relative to a secondary of the transformer (or vice versa). An important feature of this particular arrangement is that the flux linkage generated by stationary disk 14 and rotating disk 16 when stationary is the same as when the rotating disk rotates. This feature advantageously allows superconducting rotor coils 52 to be charged prior to rotating disk 16 rotating (i.e., before motor 10 operates). The structure and operation of the brushless exciter is described in U.S. patent application Ser. No. 09/480,430, entitled "Exciter and Electronic Regulator for Rotating Machinery," filed on Jan. 11, 2000, and assigned to American Superconductor Corporation.

The rotor assembly includes an electromagnetic shield 88 wrapped around the vacuum chamber 86, formed preferably from a non-magnetic material (e.g., aluminum, copper). In embodiments in which vacuum chamber 86 is formed of a different material, such as stainless steel, electromagnetic shield 88 can be mechanically located around the outer wall of the vacuum chamber 86. Electromagnetic shield 88 also acts as an induction structure (i.e., supports induction currents) and is, therefore, multi-purposed. Specifically, electromagnetic shield 88 intercepts AC magnetic fields from the stator before they impact the superconducting windings 26 of the rotor assembly 12. Further, because electromagnetic shield 60 acts as an induction structure, it can be used to operate the synchronous superconducting motor 10 at start-up in an induction mode. The electromagnetic shield 88 allows the superconducting motor 10 to operate as an induction motor for start up or in a continuous mode as a backup mode in case of a catastrophic failure of the cryogenic systems. This mode of operating a synchronous motor is described in U.S. patent application Ser. No. 09/371,692, assigned to American Superconductor Corporation, assignee of the present invention, and is incorporated herein by reference.

Figure 9:
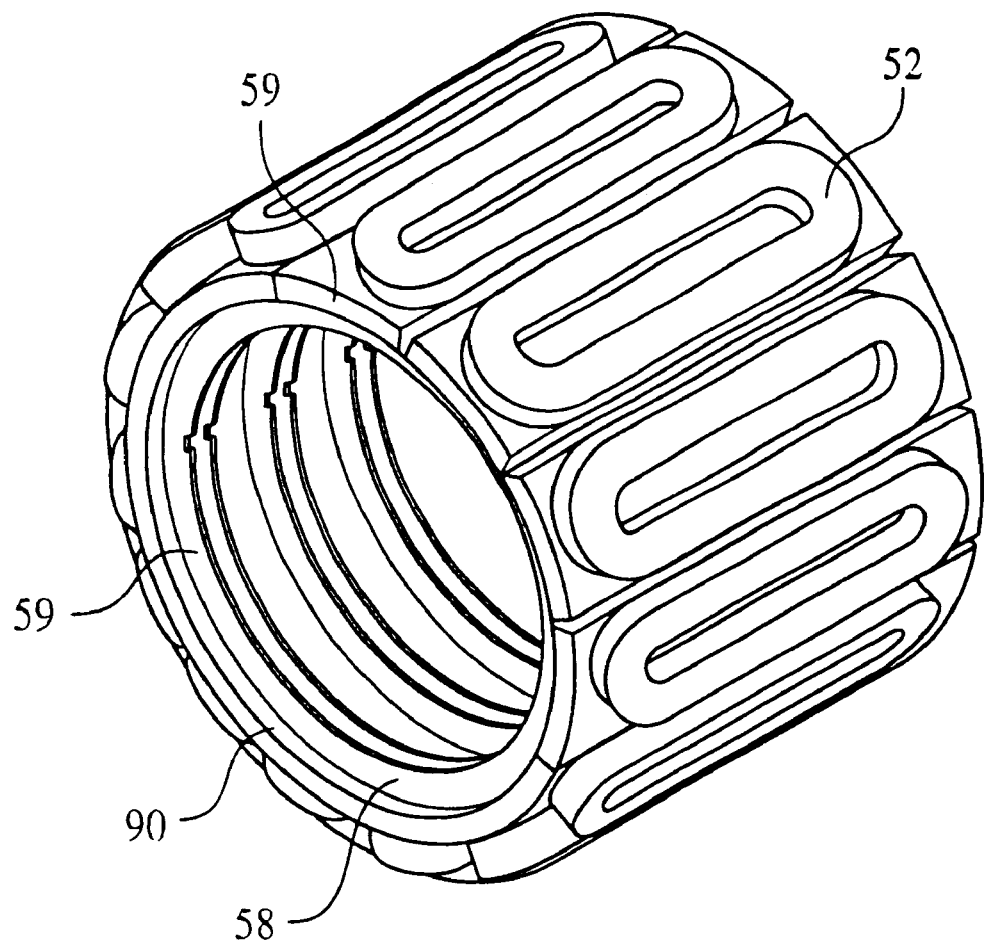
FIG. 9 is a perspective view of rotor coils mounted on a rotor body of the rotor assembly of FIG. 7.

Referring to FIG. 9, the rotor assembly 50 further includes superconducting rotor coils 52 mounted to a stainless steel rotor body 58 for support. The rotor body 58 also carries the closed cryogenic cooling loop 118 that cools the rotor coils 52. The rotor body 58 is tubular with an inner surface 90 and an outer surface 92. The outer surface 92 may be generally cylindrical in shape, or may have flats machined to accept the rotor coils 52. The machined flats may, for example, give the outer surface 92 a general pentagonal, hexagonal or heptagonal shape. In the present invention, twelve flats have been machined to accept twelve flat rotor coils 52.

The rotor body 58 includes rotor body ribs 59 to mount the tangential buckles 70 and axial buckles 60, which interface with the output shaft 82. The rotor body ribs 59 are circumferentially fixed on the inner surface 90 and extend radially inward from the inner surface 90 of the rotor body 58.

In this embodiment, the superconductor in the rotor coils 52 is a high temperature copper oxide ceramic superconducting material, such as $Bi_2Sr_2Ca_2Cu_3O_x$ or $(BiPb)_2$, commonly designated BSCCO 2223 or BSCCO (2.1)223. Other high temperature superconductors including YBCO (or superconductors where a rare earth element is substituted for the yttrium), TBCCO (i.e., thallium-barium-calcium-copper-oxide family), and HGBCCO (i.e., mercury-barium-calcium-copper-oxide family) are also within the scope of the invention. Rotor coils 52 may be formed with pancake coils either single or double layers. In certain embodiments, double pancake coils with the two coils of a pair being wound from the same continuous length of superconducting tape may be used. In this case, a pancake coil may include a diameter smaller than its associated pancake coil of the double pancake. An approach for using this approach is described in U.S. Pat. No. 5,581,220, which is assigned to American Superconductor, the assignee of the present invention, and incorporated herein by reference. Preferred embodiments are based on the magnetic and thermal properties of high temperature superconducting composites, preferably including superconducting ceramic oxides and most preferably those of the copper oxide family. The structure and operation of the superconducting windings is described in U.S. patent application Ser. No. 09/415,626, entitled "Superconducting Rotating Machine," filed on Oct. 12, 1999, assigned to American Superconductor Corporation, assignee of the present invention, and incorporated herein by reference.

Figure 10:
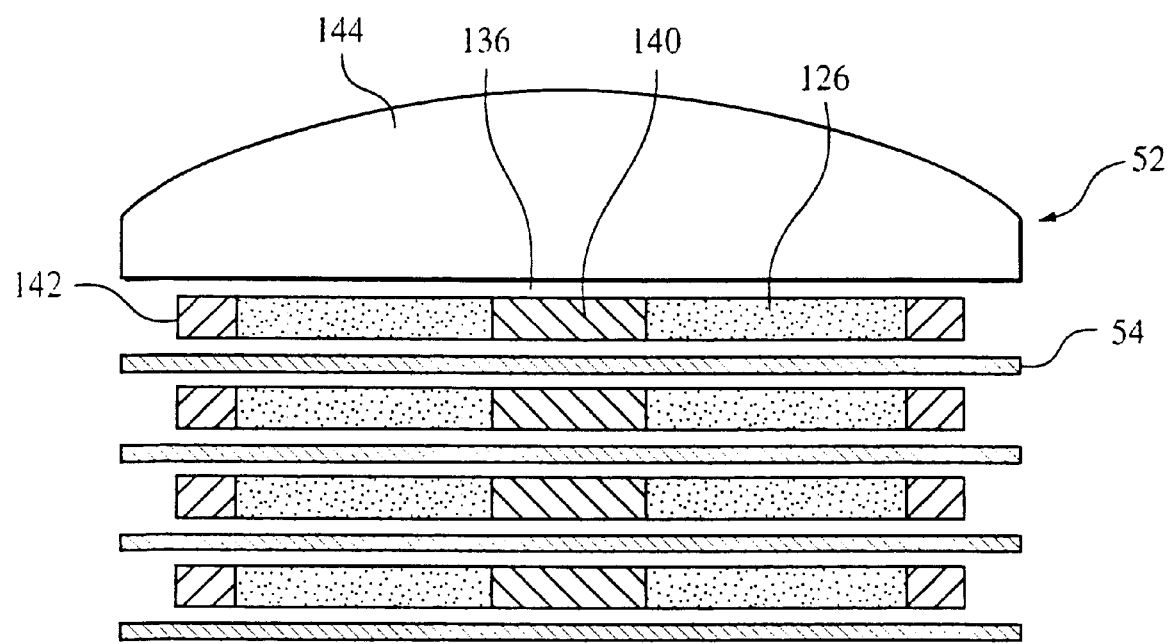
FIG. 10 is a cross-sectional view of the rotor coil stack with internal support members of the rotor coils of FIG. 9.

Referring to FIG. 10, the rotor coils 52, as described above, are fabricated with an internal support 54 to help stabilize the structure because the racetrack configuration produces tremendous bending stresses that attempt to push the superconducting coil assembly apart. To overcome this limitation, the rotor coils 52 are fabricated in a laminated configuration with internal coil supports 54, alternating between superconducting windings 126 and internal support 54. External supports, such as the inner spacer 140 and the outer spacer 142, do not sufficiently alleviate the internal stresses associated with non-circular and non-linear configurations, such as the racetrack configuration. The addition of internal coil supports 54 combined with the inner spacer 140 and outer spacer 142 gives mechanical strength to the rotor coil 52 and reduces the internal strains in the superconducting coils 126. The internal strains are reduced by using the internal coil supports 54 partly because the peak strains are located at the inside diameter of the superconducting coils 126, far removed from any external support structures that could be employed.

In the present embodiment, the internal coil support 54 is 40-mil thick stainless steel. However, it can be appreciated that various thicknesses and materials (such as copper or fiberglass composites) would work for their intended purposes, as various embodiments would require different thicknesses to optimize performance. In certain embodiments, a thermally conductive coating can be applied to the internal coil support 54 to provide better heat conductivity to cryogenic cooling tubes 118 located within the rotor body 58. For example, the internal coil support can be coated with copper.

A fastener can be used to tie the internal coil supports 54 together. For example, the layers can be mechanically fastened together by passing a bolt, or multiple bolts, through the internal coil supports 54 at a point within the annular opening 136 created by the superconductor windings 126 and fixing the assembly and top cap 144 to the rotor body 58. The bolts tie the internal coil supports 54 together into a unitary whole, resulting in even greater mechanical strength. The rotor coils 52 can also be epoxied together, with or without fasteners, to further fix the lamination together.

The internal coil support member 54 will also have various openings (not shown) to facilitate electrical connections between adjacent superconductor windings. Each superconducting coil assembly in the rotor coils 52 has to be electrically connected. Since the internal support members 54 are placed between each rotor coil 52, an opening must be provided to allow the electrical connection between each rotor coil 52.

Figure 11:
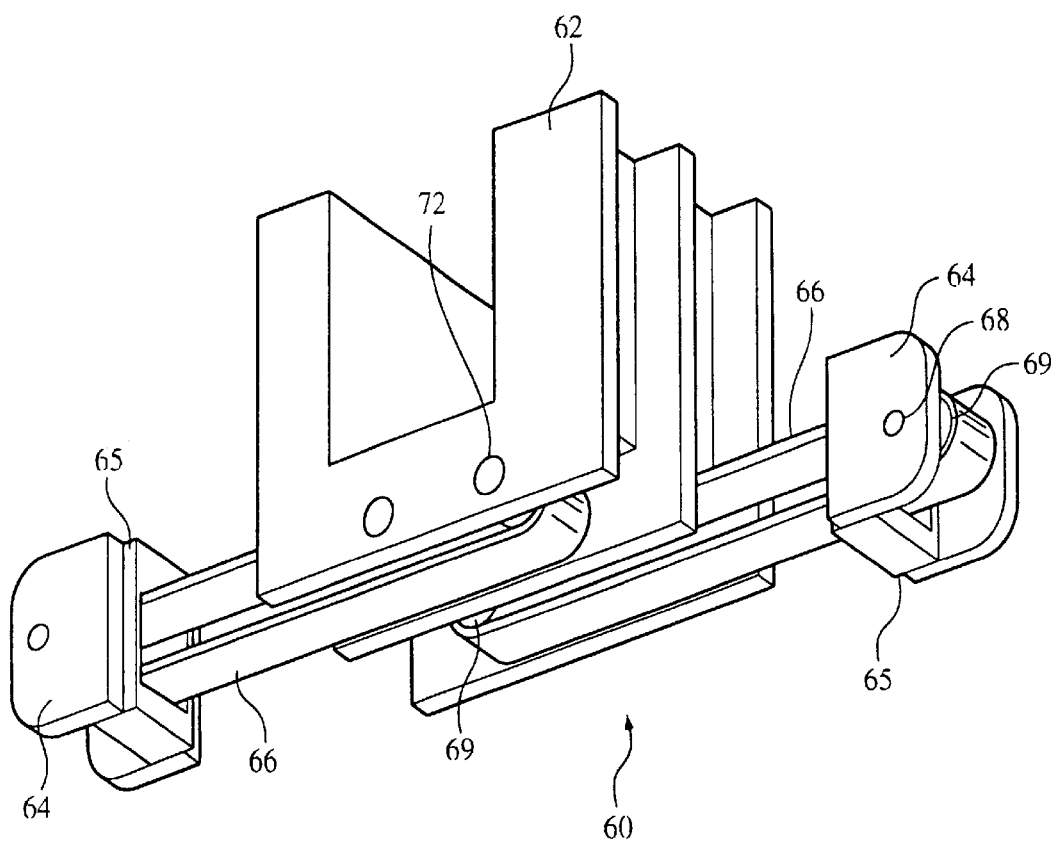
FIG. 11 is a perspective view of an axial buckle of the rotor assembly of FIG. 7.
Figure 13A:
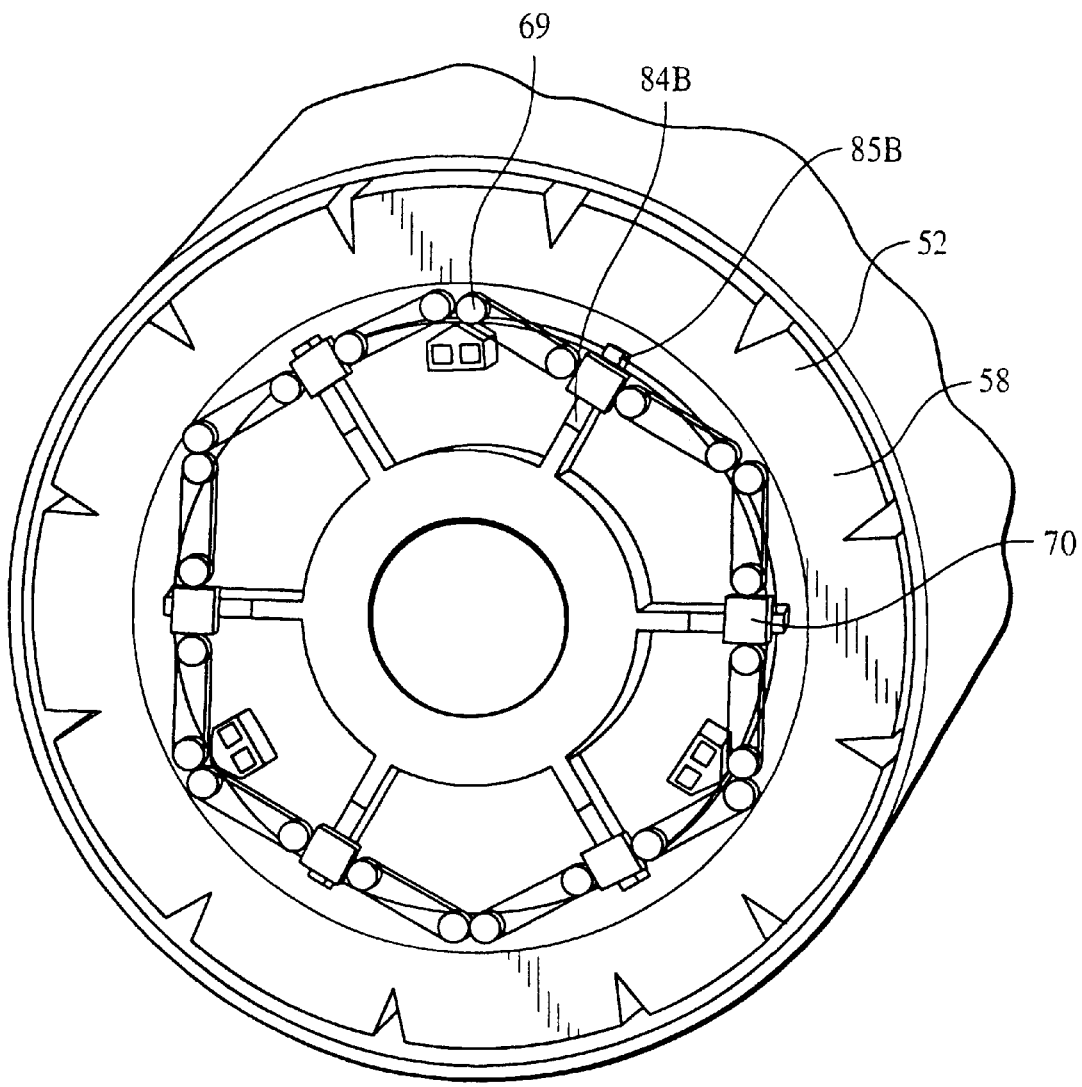
FIG. 13A is a cross-sectional perspective view of the tangential buckles mounted within the rotor assembly of FIG. 7.
Figure 13B:
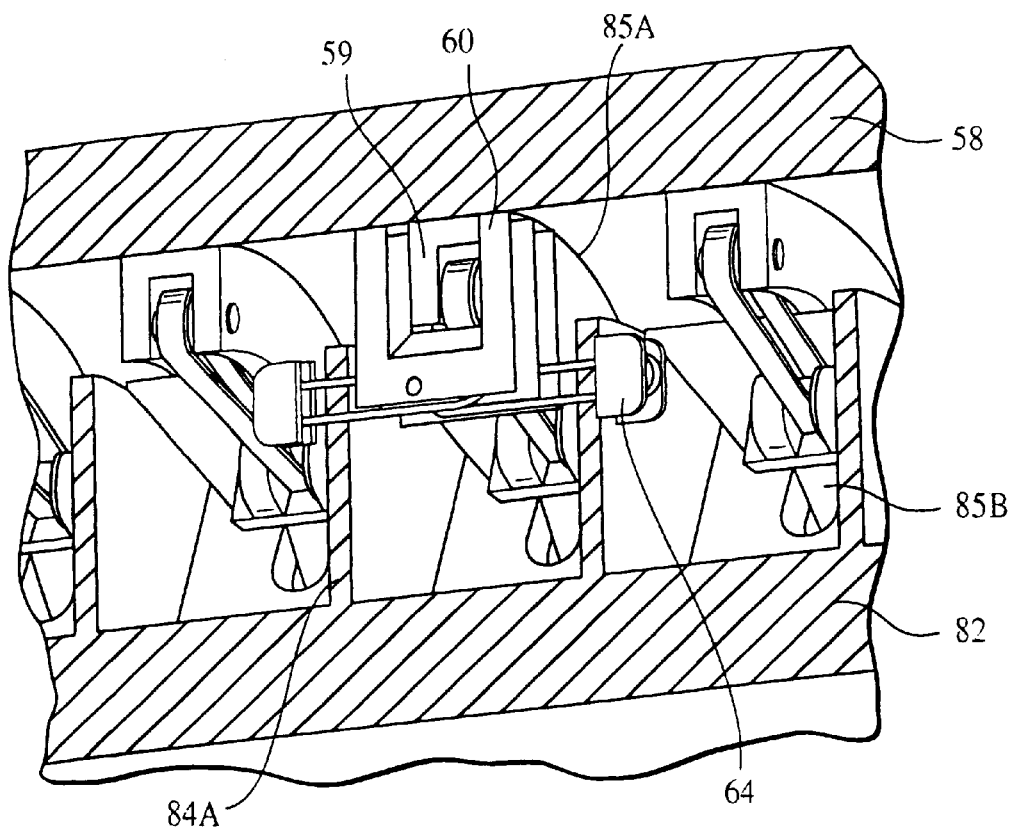
FIG. 13B is a cross-sectional perspective view of the axial buckles mounted within the rotor assembly of FIG. 7.

Referring to FIGS. 11 and 13B, the axial buckles 60 are assembled in the rotor assembly 50 to prevent axial movement between the rotor body 58 and the output shaft 82. The axial buckles 60 also thermally isolate the cryogenically cooled rotor body 58 from the output shaft 82 by using a thermally isolating coupling band 66 between the coupling members 62 and 64.

A generally U-shaped coupling member 62 is mounted to the rotor body 58 by sliding the open end over the rotor body rib 59. The rotor body rib 59 constrains the U-shaped coupling member 62 in the axial direction. Two smaller coupling members 64 are mounted in opposing radial slots 85A in the circumferential output shaft plates 84A by a narrow shoulder 65 on one face of the smaller coupling members 64. The narrow shoulder 65 slides into the radial slot 85A while the rest of the smaller coupling member 64 is wider than the radial slot 85A, thereby preventing the smaller coupling member 64 from moving beyond the slot 85A. The two smaller coupling members 64 are mechanically coupled to the U-shaped coupling member 62 by thermally isolating coupling bands 66. The thermally isolating coupling bands 66 are Para-aramid/Epoxy straps. By using thermally isolating coupling bands 66, the output shaft 82 and the rotor body 58 are thermally isolated from each other since the coupling bands 66 are the only direct connection between the U-shaped coupling member 62 and the smaller coupling members 64. This thermal isolation helps prevent the output shaft 82 from acting as a heat sink.

The coupling bands 66 wrap around spherical ball end couplings 69 mounted in the U-shaped coupling member 62 and the smaller coupling members 64. The spherical ball end coupling 69 in one of the smaller coupling members is a cam 68, which is used to preload the coupling bands 66. Surrounding the cylindrical pins 72 and cam 68 are spherical ball ends 69. The spherical ball end couplings 69 hold the coupling band 66 and provide misalignment adjustment. The spherical ball end couplings 69 maintain even loading to the coupling band 66. The coupling bands 66 are preloaded by turning the cam 68 to vary the tension. The coupling bands 66 are 180° apart, which allows one cam to tension both coupling bands 66 at the same time and put both coupling bands 66 in uniaxial tension. This configuration also constrains the rotor body 58 and output shaft 82 in both axial directions.

Figure 12A:
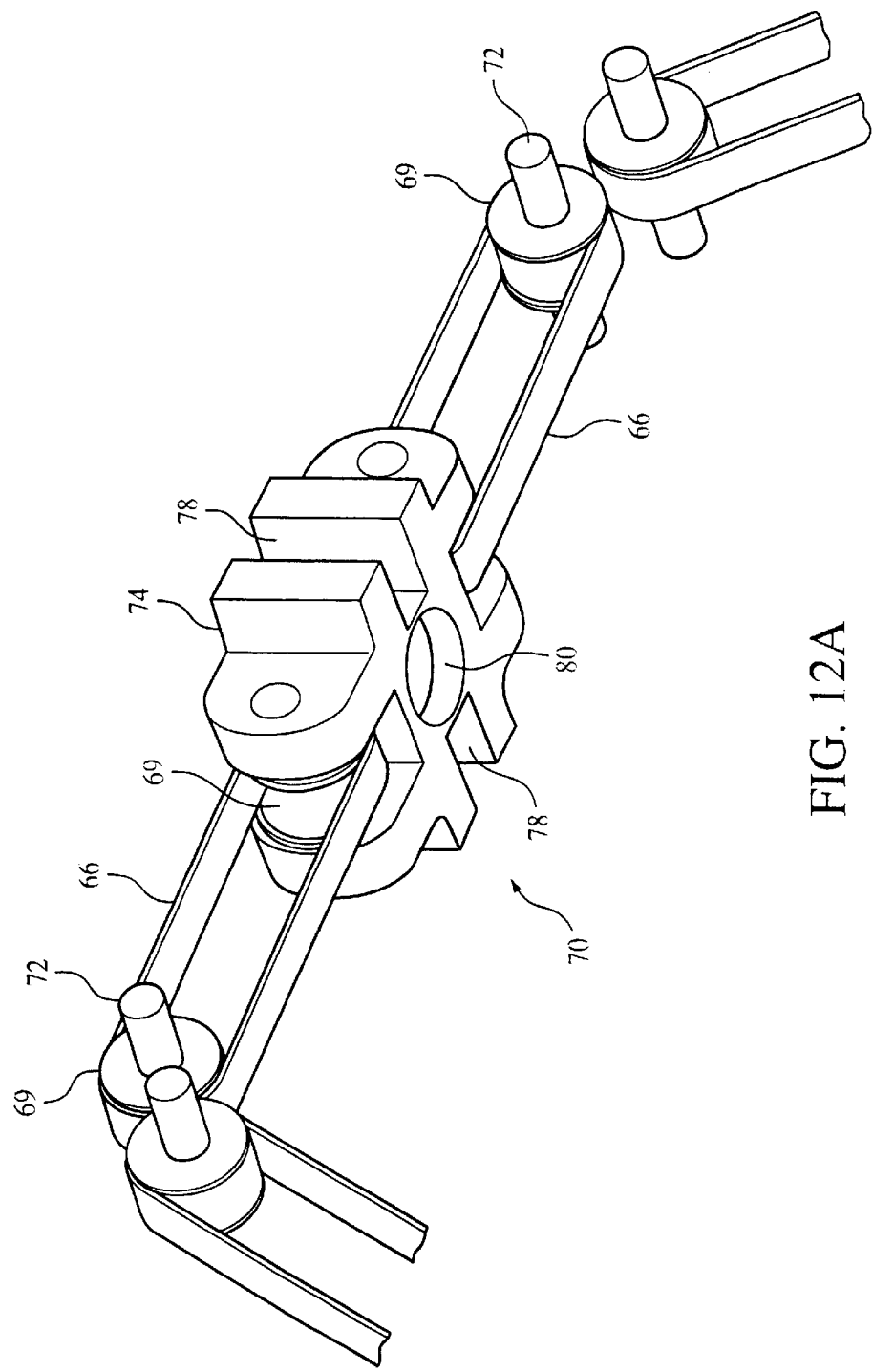
FIG. 12A is a perspective view of a tangential buckle of the rotor assembly of FIG. 7.

Referring to FIGS. 12A and 13A, the tangential buckles 70 are assembled in the rotor assembly 50 to transfer the rotational forces between the rotor body 58 and the output shaft 82. The tangential buckles 70 also thermally isolate the cryogenically cooled rotor body 58 from the output shaft 82 by using a thermally isolating coupling band 66 between the coupling members 72 and 74.

An X-shaped coupling member 74 is mounted to the output shaft 82 by two recessed slide mounting areas 78 located on opposing legs of the X-shaped coupling member 74. These recessed slide mount areas 78 are positioned such that the X-shape coupling member 74 mounts parallel to the axis of the output shaft 82. The recessed slide mounting areas 78 slide down into the radial slot 85B in the longitudinal plates 84B, which constrain the X-shaped coupling 74 in the circumferential and axial directions. Two spherical ball end couplings 69 are mounted between the rotor body ribs 59 by pressing a cylindrical pin 72 through the rotor body ribs 59 and a spherical ball end coupling 69. The spherical ball end couplings 69 are mechanically coupled to the X-shaped coupling member 74 by thermally isolating coupling bands 66. As discussed above, the thermally isolating coupling bands are Para-aramid/Epoxy straps, which thermally isolate the rotor body 58 from the output shaft 82.

Figure 12B:
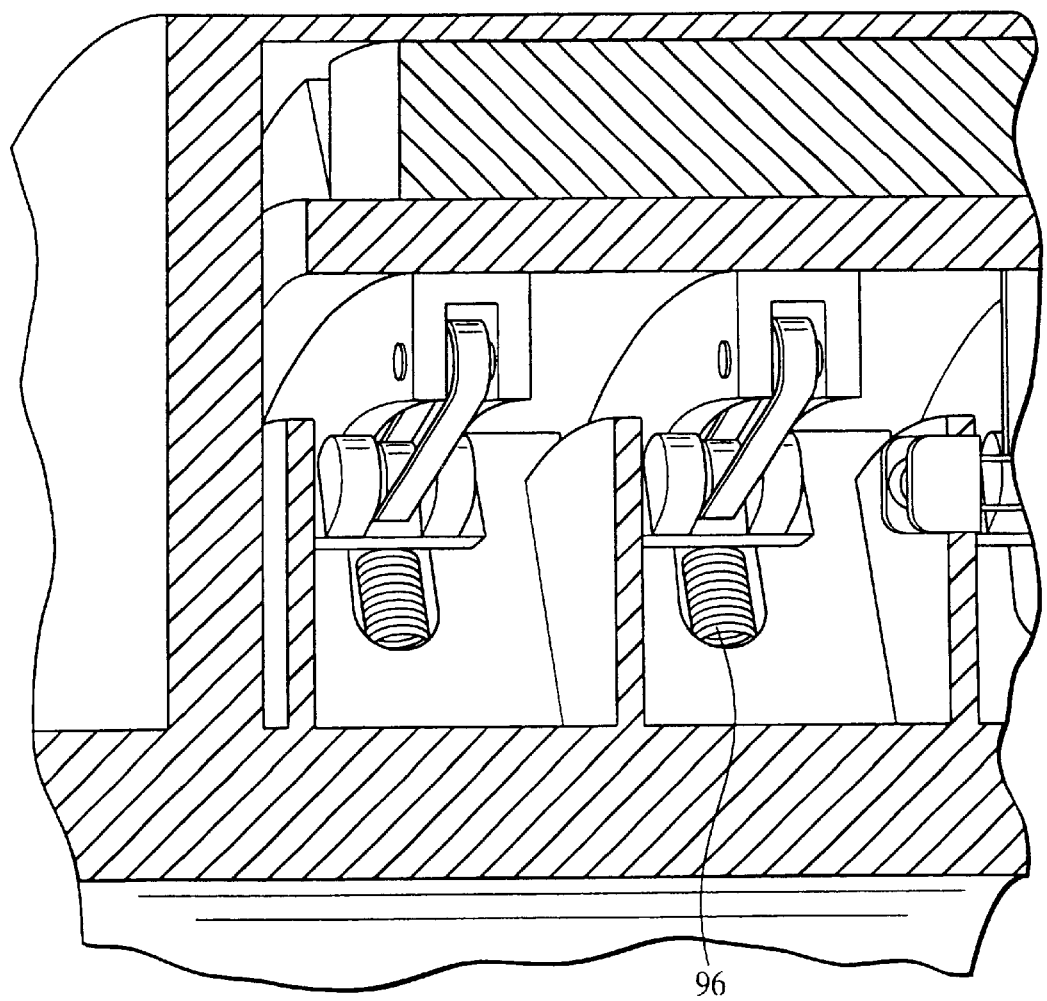
FIG. 12B is a perspective view of the tangential buckle of FIG. 12 mounted with a spring.

Referring to FIGS. 12A and 12B, the coupling bands 66 wrap around spherical ball end couplings 69 mounted in the X-shaped coupling member 74, in the two legs not defining the recessed slide mounting area 78, and around the spherical ball end coupling 69 mounted in the rotor body ribs 59. The coupling bands 66 are mounted approximately 180° apart, which allows both coupling bands to be in uniaxial tension. The X-shaped coupling member 74 defines an opening 80 therethrough sized to accept a spring 96, which preloads both bands in uniaxial tension. The opening 80 is defined so as to be perpendicular to the axis of the output shaft 82 when the X-shaped coupling member 74 is mounted to the output shaft 82, allowing the spring 96 to push the X-shaped coupling member 74 radially outward. The spring 96 allows the tangential buckle 70 to be preloaded by compressing the spring 96. The spring 96 also allows for some compliance when the tangential buckle 70 is assembled within the rotor assembly 50. The compressed spring 96 allows each tangential buckle 70 to be quickly preloaded by adjusting to any manufacturing tolerance differentiation, for example, within the coupling bands 66, thereby facilitating a quicker build time for the rotor assembly 50. The preload feature also facilitates loading the coupling bands 66 in pure tension. By loading the coupling bands 66 in pure tension, the assembly can transmit an extremely large torque between the rotor body 58 and the output shaft 82.

The longitudinal output shaft plates 84B are sized within axial slots (FIG. 13A) in the rotor body 58 such that they will bottom out during a high fault loading situation, thereby preventing the coupling bands 66 from breaking. If a sudden shock load is applied to the motor 10, metal-to-metal contact will occur. The advantage to designing such a shock system is that the coupling bands 66 do not have to be sized for fault and shock loads, which would make the coupling bands 66 less practical.

Figure 14:
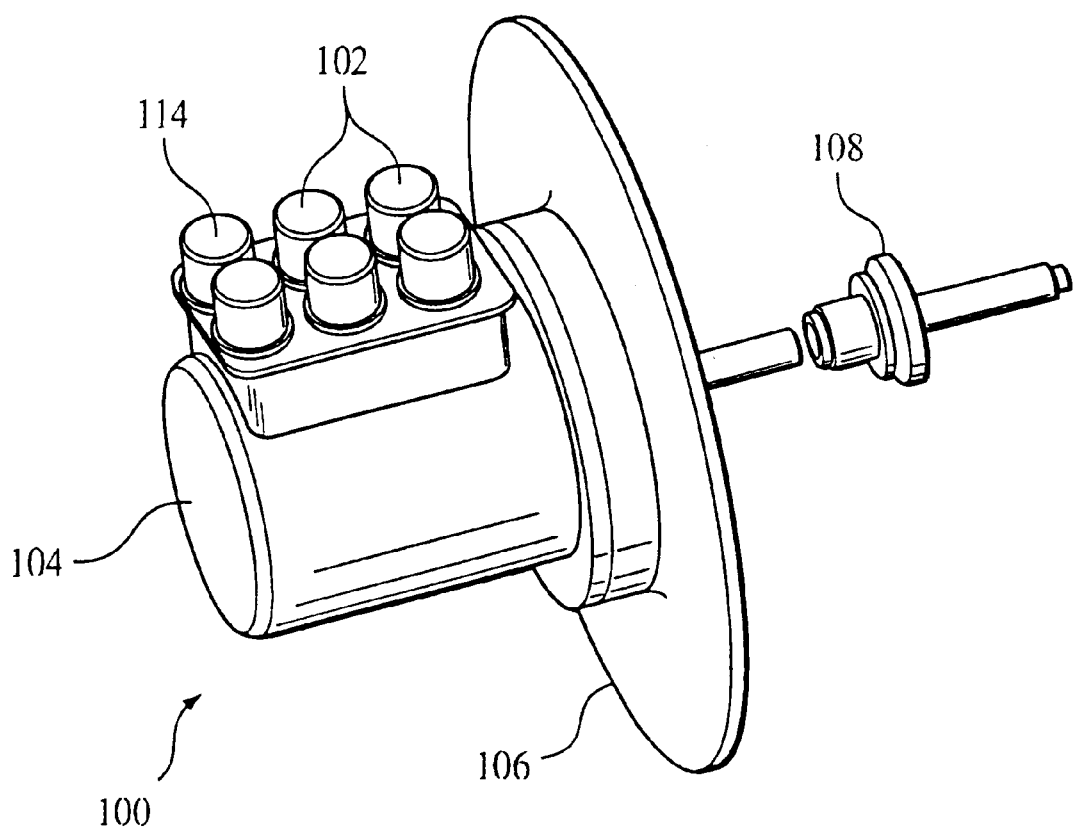
FIG. 14 is a perspective view of a cryogenic cooling system and mounting flange of the superconducting motor of FIG. 1.
Figure 15:
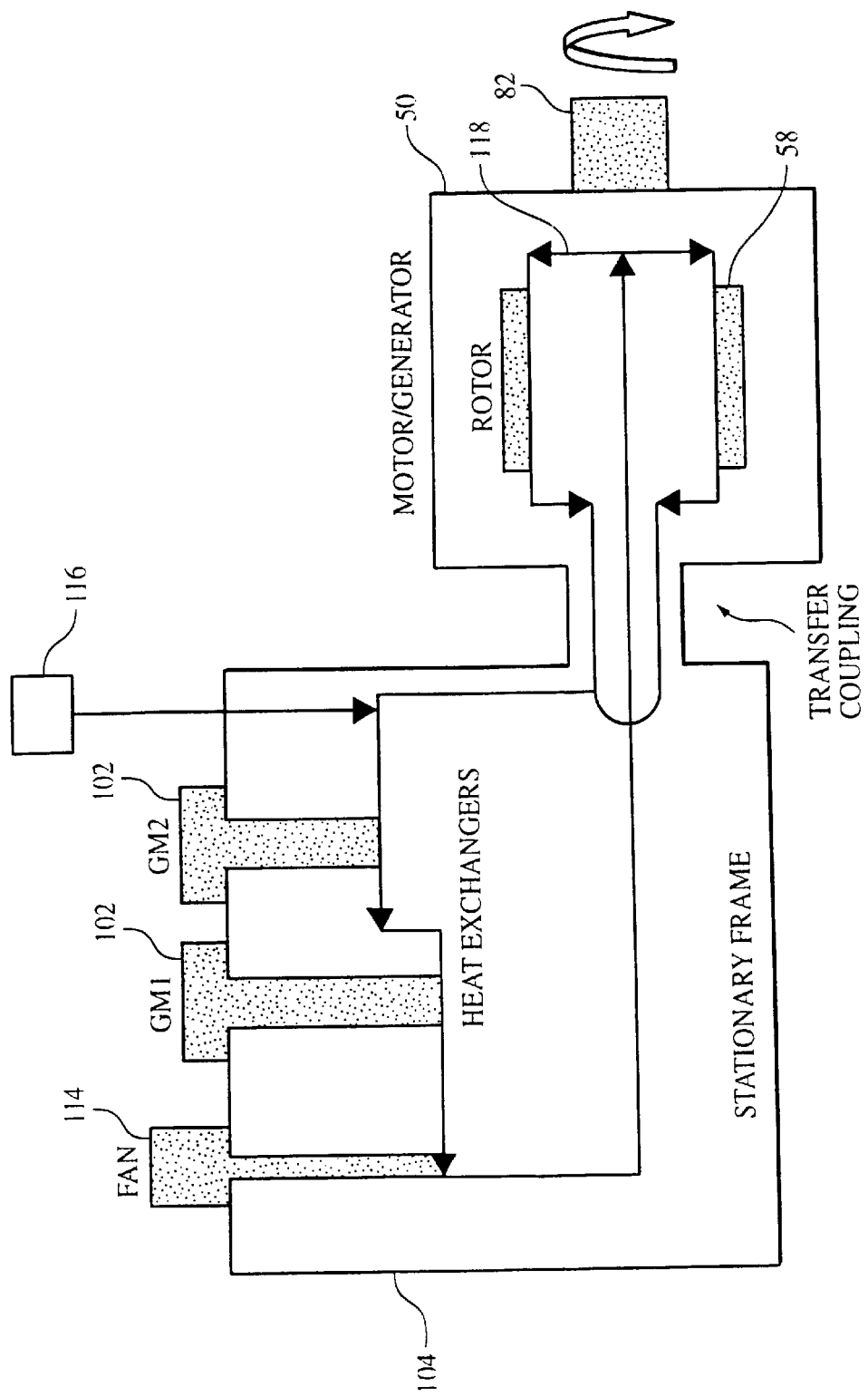
FIG. 15 is a block diagram of a cryogenic cooling system of the superconducting motor of FIG. 1.

Referring to FIGS. 2, 14 and 15, a cryogenic cooling system 100 is used to maintain a cryogenic fluid at cryogenic temperatures and move the cryogenic fluid to and from a cryogenic cooling loop 118 located adjacent and in thermal communication with the rotor coils 52. The cryogenic fluid is moved through the cryogenic cooling loop 118 by a cryogenically adaptable fan 114. This system helps maintain the rotor coils 52 at cryogenic temperatures, because the superconducting rotor coils 52 have to be maintained at cryogenic temperatures (i.e., below−79° C.) to operate properly and efficiently. The cryogenic cooling system 100 includes multiple cryogenically cooled surfaces 102, here Gifford-McMahon cold heads, mounted in cryocooler assemblies 104, a mounting flange 106 and a cryogenically adaptable fan 114. The cryogenic cooling system 100 utilizes a closed loop system for efficiency and ease of maintenance.

The advantage of more than one cryogenically cooled surface 102 is efficiency and ease of maintenance. First, more than one cryogenically cooled surface 102 in series will allow each cryogenically cooled surface 102 to work less to lower the temperature of the cryogenic fluid. Also, if one cryogenically cooled surfaces 102 malfunctions, the redundancy in the system will be able to overcome the loss. Further, if one cryogenically cooled surface 102 does malfunction, the malfunctioning cryogenically cooled surface 102 can be isolated from the system by proper valving, and maintenance performed without shutting down the system or introducing contaminants into the system.

The cryocooler assembly 104 mounts to the outside of the superconducting motor 10 via a mounting flange 106 fixed to the housing 12. The fixed cryocooler assembly 104 is in fluidic communication with a cryogenic cooling loop 118. In an embodiment with a rotating thermal load, such as the rotor coils 52, the cryocooler assembly 104 interfaces with the rotating cryogenic cooling loop 118 by interfacing with a rotary seal 108, here a ferrofluidic rotary seal. The rotary seal 108 allows the cryocooler assembly 104 to remain fixed while the cryogenic cooling loop 118 rotates with the rotor assembly 50. The cryocooler assembly 104 is maintained stationary, rather than rotating, due to undesirable high gravity heat transfer seen internal to the cryocooler assembly 104 if it were to rotate. The cryogenic cooling loop 118 is in thermal communication with the rotor coils 52, maintaining the rotor coils 52 at a cryogenic temperature.

The cryocooler assembly 104 is open to the vacuum chamber 86 of the rotor assembly 50. Keeping the internal area of the cryocooler assembly 104 at vacuum helps to isolate the portion of the cryogenic cooling loop 118 that is located within the cryocooler assembly 104 from outside temperatures. The vacuum isolation further helps improve the efficiency of the cryogenically cooled surfaces 102.

The cryogenic fluid, helium in this embodiment, is introduced into the system from a cryogenic fluid source 116. The cryogenic cooling system is a closed system, but cryogenic fluid will have to be added periodically should any leaks develop. Other cryogenic fluids, such as hydrogen, neon or oxygen, may also be used.

The cryogenic fluid must be moved from the cryocooler 104 to the portion of the cryogenic cooling loop 118 located within the rotor body 58. A cryogenically adaptable fan 114 is employed to physically move the cryogenic fluid. The advantage of a fan is that a fan does not require a heat exchanger to warm the fluid to the temperature of an ambient compressor, is inexpensive and is relatively small. In comparison, a prior art room temperature compressor in conjunction with a heat exchanger is more expensive and is much larger. Further details of the operation of the cryogenic cooling system 100 can be found in U.S. patent application Ser. No. 09/480,396, entitled "Cooling System for HTS Machines," filed on Jan. 11, 2000, and assigned to American Superconductor Corporation, assignee of the present invention.

In the embodiments described above the rotor assembly included the rotor body 58 and the output shaft 82, which are both of one-piece design. In other embodiments, the rotor body and portions of the output shaft can be constructed from smaller, identical, and more manageable segments, thereby facilitating assembly.

Figure 16:
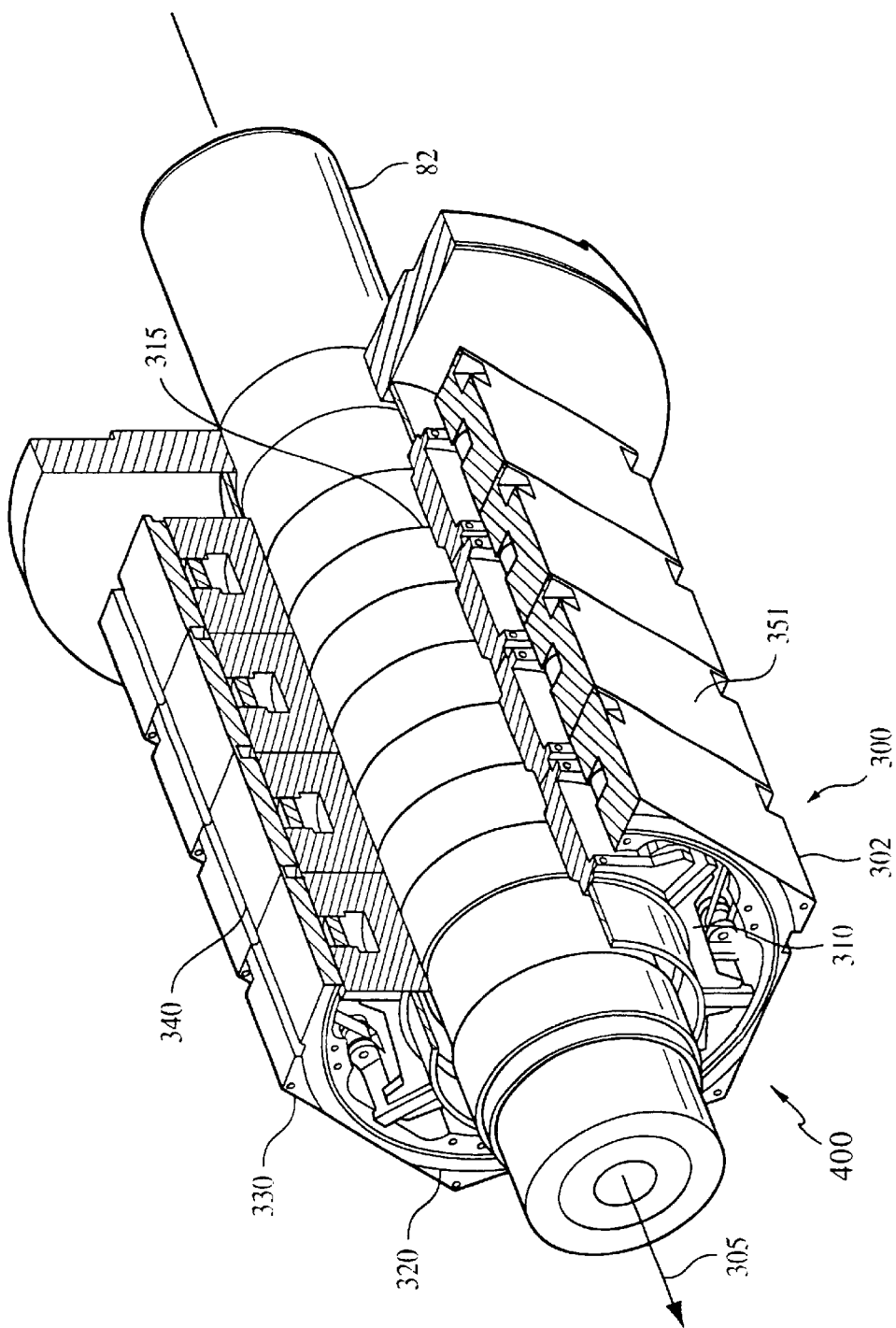
FIG. 16 is a cross-sectional perspective view of a portion of another embodiment of a rotor assembly.

Referring to FIG. 16, for example, a segmented rotor assembly 400 is shown without an electromagnetic shield and superconducting coils. In this embodiment, the rotor assembly 400 is constructed with four hexagon-shaped rotor body segments 300. In other embodiments, the rotor assembly may include fewer or more rotor body segments and may have other polygonal shapes. Each rotor body segment 300 includes a support structure 302 surrounding a hub 310. Each support structure 302 includes a recessed face 320 on one interconnecting side, and a complementary protruding face 323 on the opposite side to allow stacking of the rotor body segments 300 during assembly. The hubs, in aggregate, form a bore that receives and engages the output shaft 82 of the superconducting motor 10. In particular, the outer surface of the output shaft 82 includes splining features 315 for engaging complementary non-cylindrical shaped portions of the hubs 310. During assembly, surfaces of the non-cylindrical splining features 315 lock axially to fit with corresponding surfaces of the hubs 310, so that, in operation, the hubs 310 transfer the torque generated by the superconducting coils 52 to the output shaft 82.

Figure 17:
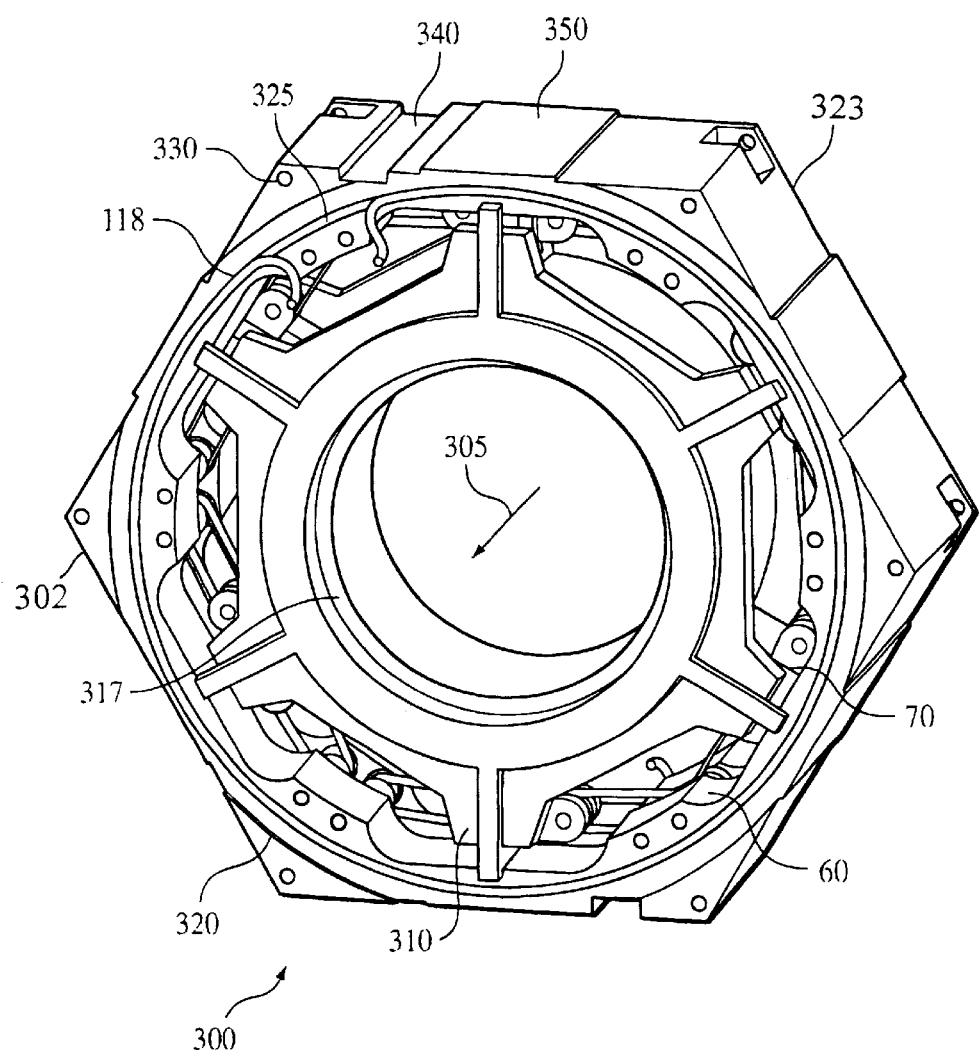
FIG. 17 is a perspective view of a rotor body segment of the rotor assembly of FIG. 16.

Referring as well to FIG. 17, each rotor body segment support structure 302 is mechanically coupled to a corresponding hub 310 with the same tangential buckles 70 and axial buckles 60 described above in conjunction with FIG. 7. As was the case in the embodiment of FIG. 7, the tangential buckles 70 and axial buckles 60 transfer the torque and forces produced by the superconducting coils 52, while thermally isolating the cryogenically cooled rotor body from the output shaft 82. In this embodiment, the buckle assemblies transfer the torque and forces, produced by the superconducting coils 52, from the support structure 302 to the hub 310 while thermally isolating the support structure 302 from the hub 310. In turn, the hub 310 transfers the torque and forces to the mechanically coupled output shaft 82 through the splining features.

As shown most clearly in FIG. 17, manageability of and access to the tangential buckles 70 and axial buckles 60, as well as the segment support structure 302 and hub 310 (to which they are connected) is facilitated by the segmented construction of this embodiment. Because each individual rotor body segment is smaller and virtually identical, working on the segmented rotor assembly 400 and its components (i.e., assembly, maintenance, and replacement) is much easier than working on a one-piece design rotor assembly. In particular, the problem of access to the internal buckle assemblies (that is, those that are not accessible at the ends) is minimized. Once the individual rotor body segment support structures, hubs, and buckle assemblies are assembled into a unit, they can, in turn, be assembled into a complete rotor assembly, as shown in FIG. 16, in the manner described below.

Each rotor body segment support structure 302 includes at least two outer surfaces having recesses 340. To assemble the four rotor body segments, each segment is positioned along a longitudinal axis 305 of the rotor assembly so that the recesses are aligned and elongated wedge key (not shown) are secured within the recesses 300. In this manner, a tangential lock is provided across the segmented rotor assembly 400 and torque generated by the superconducting coils 52 is uniformly distributed across all of the rotor body segments 300. Each rotor body segment support structure 302 also includes holes 330 for receiving bolting screws (not shown) to secure adjacent rotor body segments 300. In one embodiment the bolting screws can have a length sufficient to extend through all of the segments. In another embodiment, one end of the holes 330 may be threaded to secure the bolting screw.

Referring to FIG. 17, each of the outer surfaces, of the rotor body segment support structure 302, include a raised surface 350 which when assembled together with other rotor body segments, form a raised surface 351 for receiving a superconducting coil 52. In many applications, the raised surface 351 is machined as a matched set before assembly, to ensure flatness so that minimal stress and strain is induced on the mounted superconducting rotor coil 52.

Each rotor body segment support structure 302 includes at least one channel 325 disposed peripherally about the support structure within which a cryogenic cooling tube loop 118 is disposed. The cryogenic tube receives coolant from an external source for cooling the superconducting coils 52. The coolant enters, then traverses the channel 325 and then is expelled by the closed cryogenic cooling loop 118 to the external source. The inner diameter of the hub 310 includes a complementary non-cylindrical splining feature 317 that interlocks the non-cylindrical splining feature 315 of the output shaft 82. This allows the output shaft 82 to press fit into the hub without further connection mechanisms. Thermal isolation of the hub 310 results in no temperature gradient between the hub 310 and the output shaft 82. Thus the temperature reduction produced by the coolant does not appear to the output shaft 82 of the superconducting motor 10.

Figure 18:
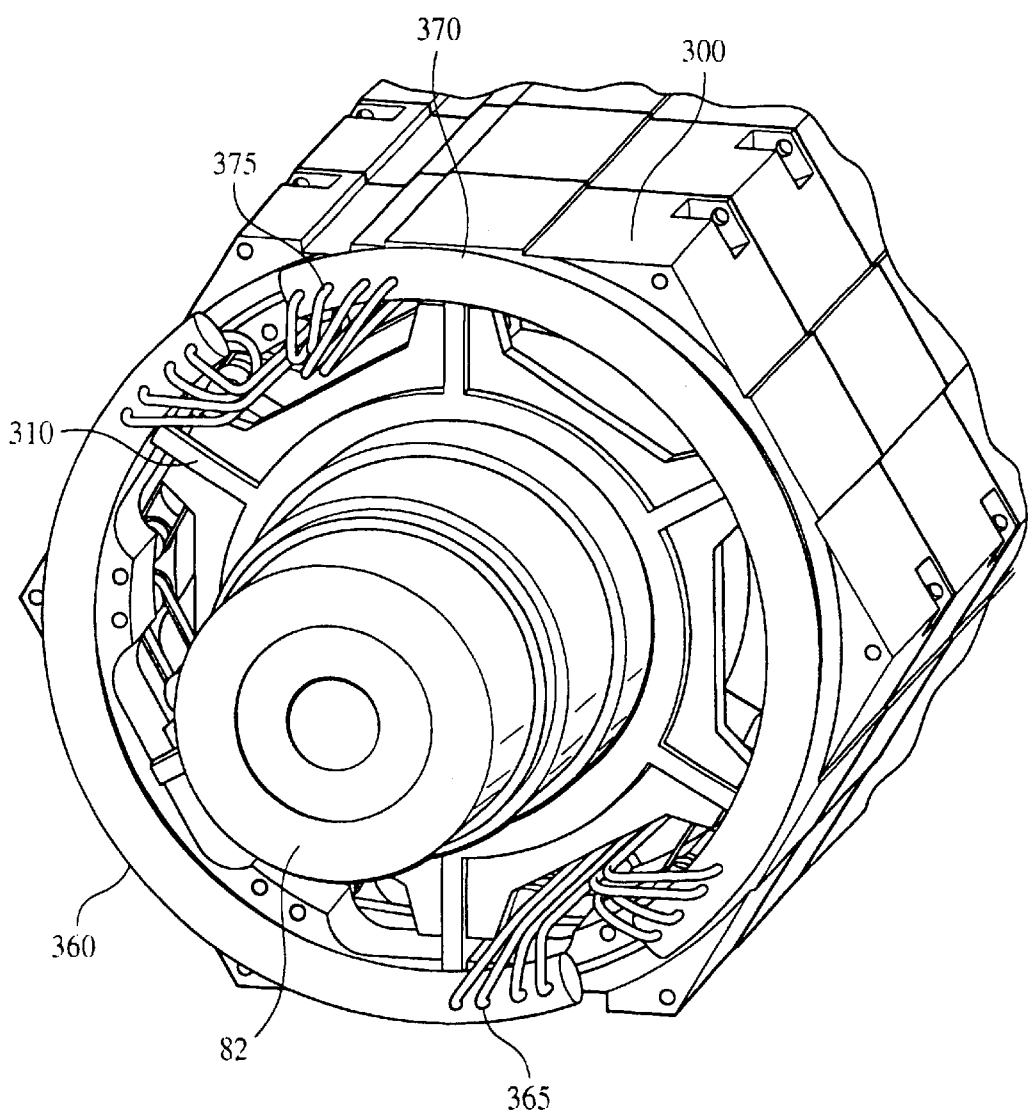
FIG. 18 is a perspective view of a coolant manifold mounted on the segmented rotor assembly of FIG. 16.

Referring to FIG. 18, an inflow manifold 360 and an outflow manifold 370 are shown both mounted circumferentially over the output shaft 82 at one end of the segmented rotor body 400. The manifolds 360, 370 are thermally isolated from each other and distribute the coolant, into the rotor body segments 300, for cooling the superconducting coils 52. In particular, the inflow manifold 360 directs inflowing coolant from the external source into each closed cryogenic cooling loop 118 located in each rotor body segment support structure 302. A fluid feed line 365 connects each closed cryogenic cooling loop 118 input to the inflow manifold 360. Correspondingly a fluid feed line 375 connects each closed cryogenic cooling loop 118 output to the outflow manifold 370 for collection of the coolant by the external source.

Figure 19:
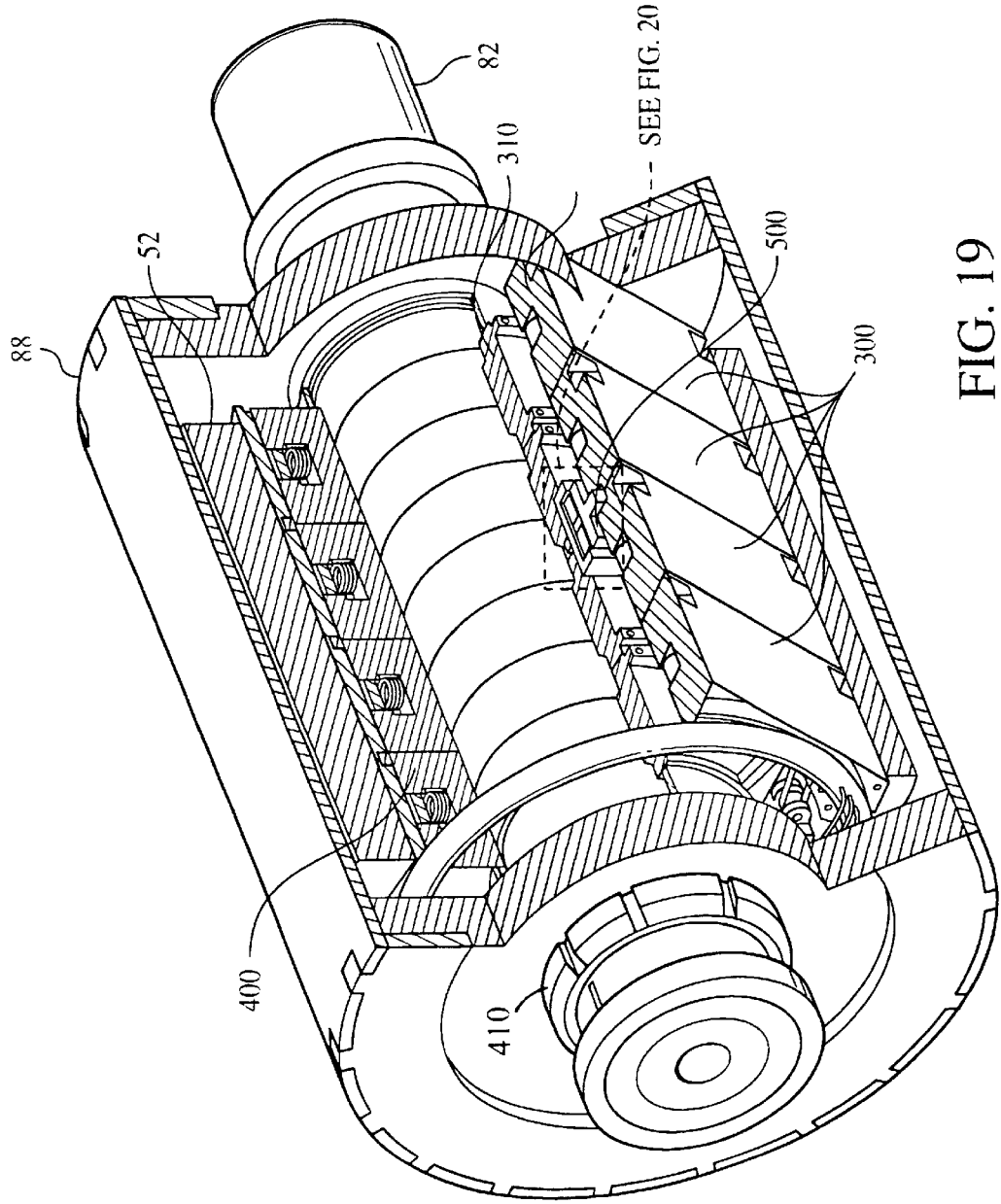
FIG. 19 is a perspective view of another embodiment of a rotor body assembly having axial compression devices.

Referring to FIG. 19, in another embodiment, the segmented rotor assembly 400 is shown having the electromagnetic shield 88 surrounding mounted superconducting rotor coils 52. In this embodiment, the union of four rotor body segments 300 forms the segmented rotor assembly 400. Each junction between adjacent rotor body segments 300 includes an axial compression device 500 (for simplicity, only one axial compression device—within dashed lines—is shown in FIG. 19) for connecting a hub 310 to a corresponding support structure 302. Unlike the embodiment described above in conjunction with FIGS. 17 and 18, the axial compression devices 500 are used in place of the axial buckles 60 of the type shown in FIG. 7. The axial compression devices 500 use compression, instead of the tension provided by the axial buckles 60, to prevent axial movement of the segmented rotor assembly 400 and the output shaft 82 while providing thermal isolation between the cryogenically cool support structure and the warm hub.

Figure 20:
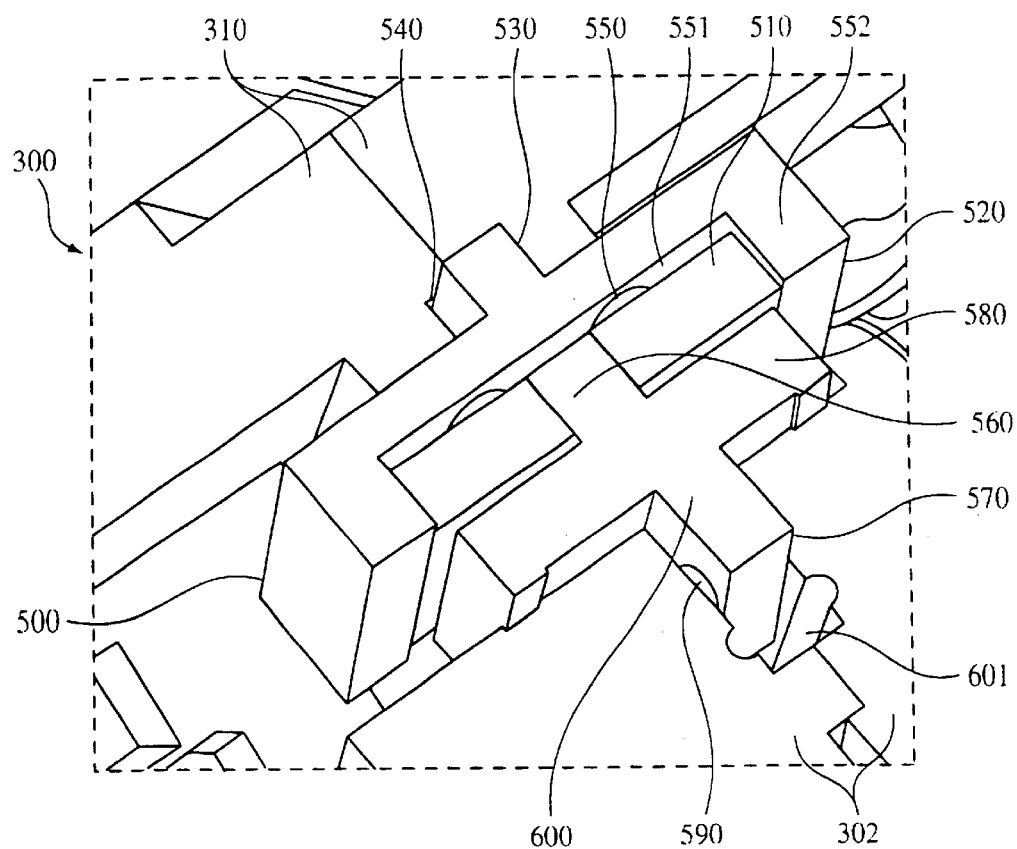
FIG. 20 is a perspective view of a portion of an axial compression device shown in FIG. 19.

Referring to FIG. 20, each axial compression device 500 includes a pair of compression blocks 510, a generally U-shaped support member 530, and a cross-shaped support member 570. The U-shaped support member 530 connects the compression blocks 510 to the hubs 310, while the cross-shaped support member 570 connects the composite material blocks 510 to the support structures 302. The U-shaped support member 530 and cross-shaped support member 570 are typically formed from a mechanically strong material (e.g., steel or stainless steel), while the compression blocks 510 are formed of a mechanically rigid and thermally insulative material, such as glass reinforced epoxy (e.g., G-10).

The generally U-shaped support member 530 is received by a cutout 540 formed at the junction of a pair of adjacent hubs 310. Bolts 550 secure the U-shaped support member 530 to each of the hubs 310. The U-shaped support member 530 includes an opening 551 defined by a pair of extending arms 552. The opening 551 receives a lower arm 560 of the cross-shaped support member 570 positioned between two compression blocks 510. Two horizontal arms 580 of the cross-shaped support member 570 attach to the pair of corresponding adjacent support structures 302. A bolt 590 secures an upper arm 600, of the cross-shaped support member 570, into a cutout 601 formed at the junction of the adjacent support structures 302.

In one particular embodiment, the composite material blocks 510 loosely fit into the U-shaped support member 530 to allow for thermal expansion and compression and decompression of the blocks in either axial direction. In certain embodiments, the blocks are bonded together (e.g., with fasteners, epoxy) so that the blocks withstand high load compression while providing thermal isolation.

In one particular embodiment, the axial compression devices 500 are positioned circumferentially every 120° about the junction of adjacent rotor body segments 300. In this case, three axial compression devices 500 are positioned about the circumference of each junction. In another embodiment, the axial compression devices are positioned circumferentially every 60° about the junction of adjacent rotor body segments 300. With this arrangement, six axial compression devices 500 are positioned about the circumference of each junction. The ability to withstand high load compression allows a woven glass material to be utilized in the composite material blocks 510. With low thermal conductivity, woven glass material can also provide the thermal isolation between the cryogenically cooled segmented rotor assembly 400 and the output shaft 82.

A number of embodiments of the invention have been described. Nevertheless, it will be understood that various modifications may be made without departing from the spirit and scope of the invention. For example, the components described could be adapted to produce other superconducting rotating machines, such as a superconducting generator. Accordingly, other embodiments are within the scope of the following claims.

What is claimed is:

1. A superconducting rotating machine comprising:
   a stator assembly; and
   a rotor assembly configured to rotate within the stator assembly and spaced from the stator assembly by a gap, the rotor assembly comprising:
      at least one high temperature superconducting winding assembly which, in operation, generates a magnetic flux linking the stator assembly;. and
      a cryogenic cooling system for cooling the at least one superconducting winding assembly of the rotor assembly;
      wherein the at least one superconducting winding assembly has an axis extending from a first end to a second end of the winding assembly, the winding assembly comprising:
         a plurality superconducting coils at least one of the plurality of superconducting coils having a superconductor tape wound about and disposed along an axis of the winding assembly to provide a plurality of concentric turns defining an opening, each turn of the superconductor tape having a broad surface maintained substantially parallel to the axis of the winding assembly; and
         a plurality of internal support members positioned between adjacent ones of the plurality of superconducting coils, wherein a laminated stack is created alternating between a superconducting coil and an internal support member.

2. The superconducting rotating machine of claim 1, wherein at least one of the plurality of internal support members is stainless steel with a thickness ranging from 0.005 inches to 0.1 inches.

3. The superconducting rotating machine of claim 1 wherein the superconductor tape is wound in a racetrack shape defining a pair of opposing arcuate end sections and a pair of opposing substantially straight side sections.

4. The superconducting rotating machine of claim 1 wherein the superconductor tape includes a multi-filament composite superconductor including individual superconducting filaments which extend the length of the multi-filament composite conductor and are surrounded by a matrix-forming material.

5. The superconducting rotating machine of claim 1 wherein the superconductor tape includes an anisotropic high temperature superconductor.

6. The superconducting rotating machine of claim 5 wherein the anisotropic high temperature superconductor is $Bi_2Sr_2Ca_2Cu_3O$.

7. The superconducting rotating machine of claim 5 wherein the anisotropic high temperature superconductor is a member of the rare-earth-copper-oxide family.

8. The superconducting rotating machine of claim 1 wherein the superconducting rotating machine has a torque density of substantially 75 N m/Kg or more at substantially 500 revolutions per minute or less.

9. The superconducting rotating machine of claim 1 having a torque output substantially in the range of 0.2 M to 20 M Nm at 500 RPM or less.

10. The superconducting rotating machine of claim 1 having a gap shear stress substantially in the range of 15 psi and 100 psi.

11. A superconducting rotating machine comprising:
    a stator assembly;
    a rotor assembly configured to rotate within the stator assembly and spaced from the stator assembly by a gap, the rotor assembly comprising:

at least one high temperature superconducting winding assembly which, in operation, generates a magnetic flux linking the stator assembly; and a cryogenic cooling system for cooling the at least one superconducting winding of the rotor assembly;

a shaft disposed through the rotor assembly along the rotor assembly axis and spaced from the rotor assembly by a gap; and a plurality of tangential buckle assemblies, wherein the plurality of tangential buckle assemblies mounts the rotor assembly to the shaft to allow rotational forces to be transferred between the rotor assembly and the shaft.

12. The superconducting rotating machine of claim 11 wherein the tangential buckle assemblies further comprise thermal isolation bands to thermally isolate the rotor assembly from the shaft.

13. The superconducting rotating machine of claim 12 wherein the thermal isolation bands are formed of a material including reinforced epoxy.

14. The superconducting rotating machine of claim 11 further comprising a plurality of axial buckle assemblies wherein the plurality of axial buckle assemblies mount the rotor assembly to the shaft to secure the rotor assembly axially to the shaft.

15. The superconducting rotating machine of claim 14 wherein the axial buckle assemblies further comprise thermal isolation bands to thermally isolate the rotor assembly from the shaft.

16. The superconducting rotating machine of claim 15 wherein the thermal isolation bands are Para-aramid/Epoxy straps.

17. The superconducting rotating machine of claim 11 having a wherein the at least one superconducting winding assembly has an axis extending from a first end to a second end of the winding assembly, the winding assembly including a superconducting coil having a superconductor tape wound about and disposed along an axis of the winding assembly to provide a plurality of concentric turns defining an opening, each turn of the superconductor tape having a broad surface maintained substantially parallel to the axis of the winding assembly.

18. The superconducting rotating machine of claim 17 wherein the superconductor tape includes an anisotropic high temperature superconductor.

19. The superconducting rotating machine of claim 11 wherein the superconducting rotating machine has a torque density of substantially 75 N m/Kg or more at substantially 500 revolutions per minute or less.

20. The superconducting rotating machine of claim 11 having a torque output substantially in the range of 0.2 M to 20 M Nm at 500 RPM or less.

21. The superconducting rotating machine of claim 11 having a gap shear stress substantially in the range of 15 psi and 100 psi.

22. A superconducting rotating machine comprising:
a stator assembly; and
a rotor assembly configured to rotate within the stator assembly and spaced from the stator assembly by a gap, the rotor assembly comprising:
at least one high temperature superconducting winding assembly which, in operation, generates a magnetic flux linking the stator assembly; and
a cryogenic cooling system for cooling the at least one superconducting winding of the rotor assembly, the cryogenic cooling system comprising:
a cryostat including a cryogenically cooled surface and defining a cryogenic environment;
a cryogenic fluid transport device disposed within the cryogenic environment, the cryostat being in fluidic communication with the rotor assembly and the cryogenic fluid transport device moving a cryogenic fluid in a closed cooling loop between the cryostat and the rotor assembly and allowing the cryogenically cooled surface to remove the heat in the cryogenic fluid gathered at rotor assembly; and
a rotary coupling wherein the rotary coupling allows the cryostat to remain stationary while the closed cooling loop rotates with the rotor assembly.

23. The superconducting rotating machine of claim 22 wherein the superconductor tape is wound in a racetrack shape defining a pair of opposing arcuate end sections and a pair of opposing substantially straight side sections.

24. The superconducting rotating machine of claim 22 wherein the superconductor tape includes a multi-filament composite superconductor including individual superconducting filaments which extend the length of the multi-filament composite conductor and are surrounded by a matrix-forming material.

25. The superconducting rotating machine of claim 22 wherein the superconductor tape includes an anisotropic high temperature superconductor.

26. The superconducting rotating machine of claim 22 wherein the superconducting rotating machine has a torque density of substantially 75 N m/Kg or more at substantially 500 revolutions per minute or less.

27. The superconducting rotating machine of claim 22 having a torque output substantially in the range of 0.2 M to 20 M Nm at 500 RPM or less.

28. The superconducting rotating machine of claim 22 having a gap shear stress substantially in the range of 15 psi and 100 psi.

29. A superconducting rotating machine comprising:
a stator assembly; and
a rotor assembly configured to rotate within the stator assembly and spaced from the stator assembly by a gap, the rotor assembly comprising:
at least one high temperature superconducting winding assembly which, in operation, generates a magnetic flux linking the stator assembly; and
a cryogenic cooling system for cooling the at least one superconducting winding of the rotor assembly, the cryogenic cooling system comprising:
a cryostat including a cryogenically cooled surface and defining a cryogenic environment;
a cryogenic fluid transport device disposed within the cryogenic environment, the cryostat being in fluidic communication with a remote thermal load and the cryogenic fluid transport device moving a cryogenic fluid between the cryostat and the remote thermal load and allowing the cryogenically cooled surface to remove the heat in the cryogenic fluid gathered at the remote thermal load; and
wherein the cryogenic fluid transport device does not require a phase change in the cryogenic fluid.

30. The superconducting rotating machine of claim 29 wherein the cryogenic fluid transport device is cryogenically adaptable fan.

31. The superconducting rotating machine of claim 29 wherein the superconducting rotating machine has a torque density of substantially 75 N m/Kg or more at substantially 500 revolutions per minute or less.

32. The superconducting rotating machine of claim 29 having a torque output substantially in the range of 0.2 M to 20 M Nm at 500 RPM or less.

33. The superconducting rotating machine of claim 29 having a gap shear stress substantially in the range of 15 psi and 100 psi.

* * * * *